(12) United States Patent
Schibler

(10) Patent No.: US 12,116,045 B1
(45) Date of Patent: Oct. 15, 2024

(54) AUTOMOBILE ACCESSORY

(71) Applicant: Matthew Schibler, Kodiak, AK (US)

(72) Inventor: Matthew Schibler, Kodiak, AK (US)

( * ) Notice: Subject to any disclaimer, the term of this patent is extended or adjusted under 35 U.S.C. 154(b) by 668 days.

(21) Appl. No.: 17/318,911

(22) Filed: May 12, 2021

(51) Int. Cl.
| | | |
|---|---|---|
| *B62D 33/08* | (2006.01) | |
| *B60H 1/00* | (2006.01) | |
| *B60H 1/24* | (2006.01) | |
| *B60R 16/03* | (2006.01) | |
| *B62D 33/04* | (2006.01) | |
| *B62D 65/14* | (2006.01) | |

(52) U.S. Cl.
CPC ......... *B62D 33/08* (2013.01); *B60H 1/00564* (2013.01); *B60H 1/241* (2013.01); *B60R 16/03* (2013.01); *B62D 33/04* (2013.01); *B62D 65/14* (2013.01)

(58) Field of Classification Search
CPC .......... B60P 3/42; B62D 33/08; B62D 33/04; B62D 65/14; B62D 25/087; B60H 1/00564; B60H 1/241; B60H 1/00592; B60H 1/00271; B60R 16/03
USPC ................................................ 296/24.3, 156
See application file for complete search history.

(56) References Cited

U.S. PATENT DOCUMENTS

| | | | | | |
|---|---|---|---|---|---|
| 3,897,100 | A | * | 7/1975 | Gardner | B60J 7/041 296/156 |
| 4,183,573 | A | * | 1/1980 | DeRidder | B60P 3/32 296/166 |
| 4,243,260 | A | * | 1/1981 | Gieseking | B60P 3/32 5/118 |
| 6,957,847 | B2 | * | 10/2005 | Rigel | B60P 3/42 296/190.08 |
| 8,511,741 | B2 | * | 8/2013 | Engelbrecht | B62D 33/06 296/156 |
| 2020/0276927 | A1 | * | 9/2020 | York | B60R 9/06 |
| 2020/0377002 | A1 | * | 12/2020 | Tezza, II | B60N 3/001 |

* cited by examiner

*Primary Examiner* — Pinel E Romain
(74) *Attorney, Agent, or Firm* — McKown Bailey; Michael O'Brien

(57) ABSTRACT

An automobile accessory is configured to quickly convert a truck bed into an enclosed cargo compartment, passenger compartment, or camping compartment. The automobile accessory has a truck cabin joined to a truck bed and further comprising a truck cabin rear bulkhead. At least two pockets are arranged proximate a plurality of roller skids on the truck bed. A chassis is joined to a cargo, passenger, or camping compartment having a compartment forward bulkhead. A gasket is joined to the passenger compartment forward bulkhead. The chassis is detachably secured to the truck bed and further comprising at least two rollers. Rolling the at least two rollers into the at least two pockets and installing the gooseneck or fifth wheel adapter joins the chassis to a truck under-bed gooseneck/fifth wheel hitch and the passenger compartment forward bulkhead compresses the gasket creating a seal between the passenger compartment and the truck cabin.

6 Claims, 51 Drawing Sheets

AUTOMOBILE ACCESSORY

RELATED APPLICATION

This application claims priority to provisional patent application U.S. Ser. No. 62/988,811 filed on Mar. 12, 2020, the entire contents of which is herein incorporated by reference.

BACKGROUND

The embodiments herein relate generally to motor vehicles.

Prior to embodiments of the disclosed invention kits that converted a truck bed to an enclosed cargo compartment, a passenger compartment, or a camping compartment suffered problems with electrical service, climate control without air conditioning components protruding beyond the outer mold line of the truck and/or installed passenger, cargo, or camping compartment, vibration, and difficulty of installation and removal. Embodiments of the disclosed invention solve these problems.

SUMMARY

An automobile accessory is configured to convert a pickup truck bed into an enclosed cargo compartment, passenger compartment, or camping compartment. The automobile accessory has a truck cargo, passenger, or camping compartment joined to a truck bed and further comprising a rear bulkhead. At least two sloped pockets are arranged proximate a plurality of skids on a truck bed. A chassis is joined to the cargo, passenger or camping compartment having a passenger compartment forward bulkhead. The chassis is detachably secured to the truck bed and further comprising at least two rollers. Rolling the at least two rollers into the at least two bed-mounted skid pockets and installing the under-bed gooseneck or fifth wheel hitch adapter joins the compartment chassis to the truck chassis. A gasket is joined between a truck cabin rear bulkhead and forward bulkhead of the truck bed compartment to provide weather-proof pass through between the truck cab and the truck bed-mounted compartment. The passenger, cargo, or camping compartment forward bulkhead compresses the gasket creating a seal between the passenger compartment and the truck cabin. Four drop-leg jacks with caster wheels provide vertical support for installation and removal of the compartment from the truck bed. The drop-leg jacks also provide a means for moving or storing the cargo, passenger, or camping compartment when not installed in the truck bed. An extraction roller attachment is installed in the truck receiver hitch and provides a means for the cargo, passenger, or camping compartment to be moved rearward in the truck bed by means of a winch or by driving the truck in reverse for a short distance.

The compartment is installed in the truck bed by aligning forward rollers on truck bed roller skids, raising the front drop leg jacks, rolling the compartment further forward into the truck bed to align the rear rollers on the truck bed roller skids, and raising the rear drop leg jacks. The compartment is rolled further forward until declined roller skid pockets allow the compartment to simultaneously settle down onto the truck bed floor and truck bed rails. Removal of the compartment is completed in reverse order of installation and aided by the extraction hitch attachment and associated straps or winch cable which provide aft force sufficient to move the compartment up the inclined roller pocket and out the rear of the truck bed where it can be maneuvered on solid ground to a place for storage by means of drop leg caster wheels.

A heating, ventilation, and air conditioning system further comprises an air plenum, arranged within the passenger compartment. An intake fan is joined to the air plenum and configured to direct fresh air from outside the passenger compartment into an air intake the air plenum, the fresh air supply is drawn from the void between the truck cabin and the truck bed, segmented into as left and right side. An air conditioner is arranged in the air plenum and joined to the air intake, an air exhaust, a conditioned air output, and a recycled air input. Fresh air is conditioned and then released through a conditioned air output; then recycled air is pulled from the passenger compartment back into the air conditioner for further conditioning. Exhaust air from the air plenum is directed out of the plenum into the void between the truck cabin and truck bed opposite the side of the fresh air intake. Fresh air is directed into the passenger compartment through a vent valve and duct joined to the air plenum when the intake fan is energized and the vent valve is open.

An electrical service system has a power supply, joined to a vehicle DC electrical power supply with a 12V switch in the cabin and a powered-on relay. The relay connects the truck DC power to the truck bed compartment to support lighting, drop leg jacks, entertainment, and sound systems through a high amperage quick disconnect plug. An inverter is electrically coupled to the truck bed compartment's DC power supply. An air conditioner and alternating current power strip are electrically coupled to the inverter arranged within the passenger compartment and ventilation plenum.

A first bench seat, arranged in the passenger compartment. In some embodiments, a second bench seat is arranged in the passenger compartment behind the first bench seat. In some embodiments, a bed is arranged in the passenger compartment behind the first bench seat.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
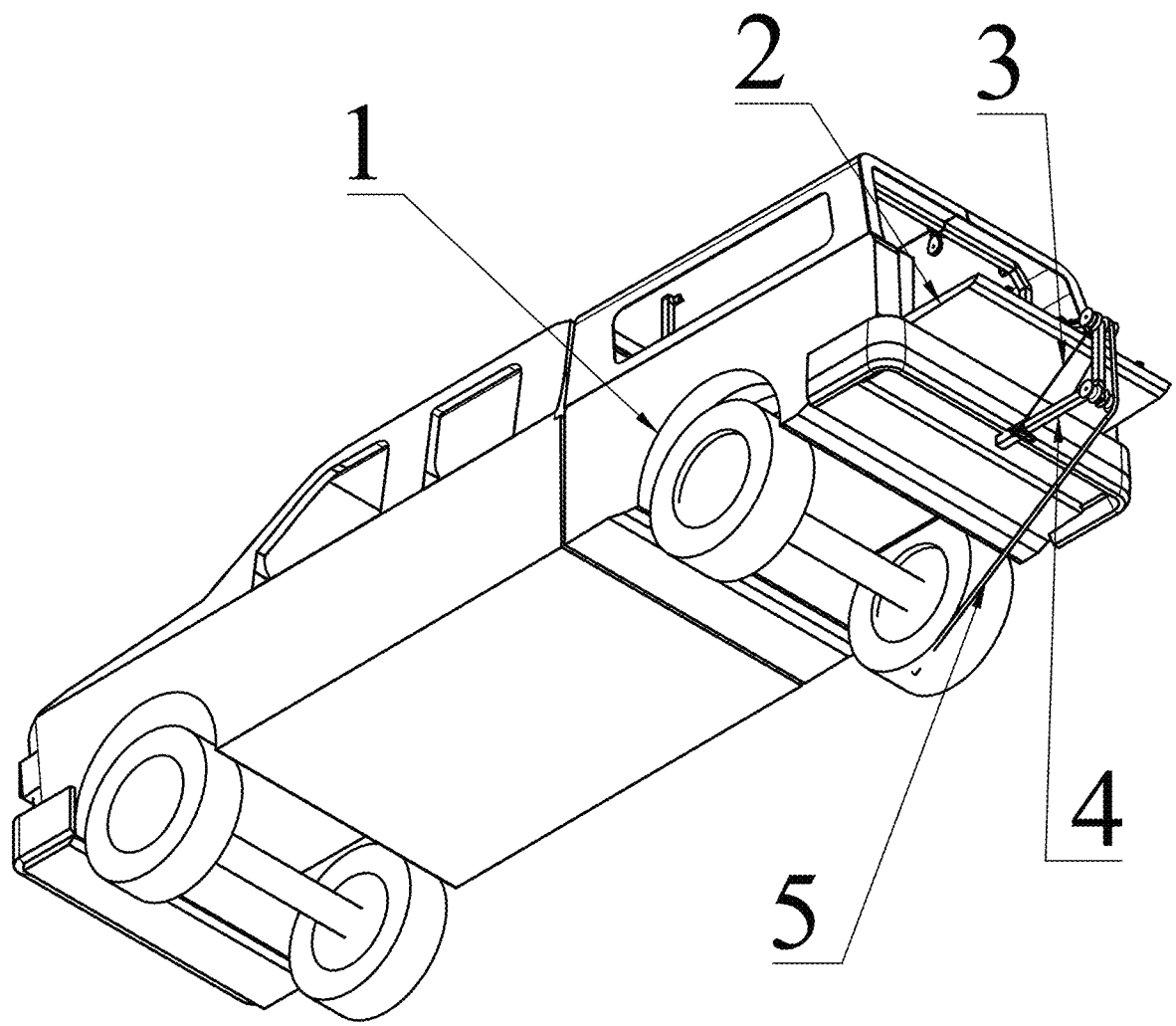
FIG. 1 illustrates a rear bottom perspective view of the cargo extraction mechanism including the extraction hitch roller attachment and two configurations of extraction cables, ropes, or straps installed.
Figure 2:
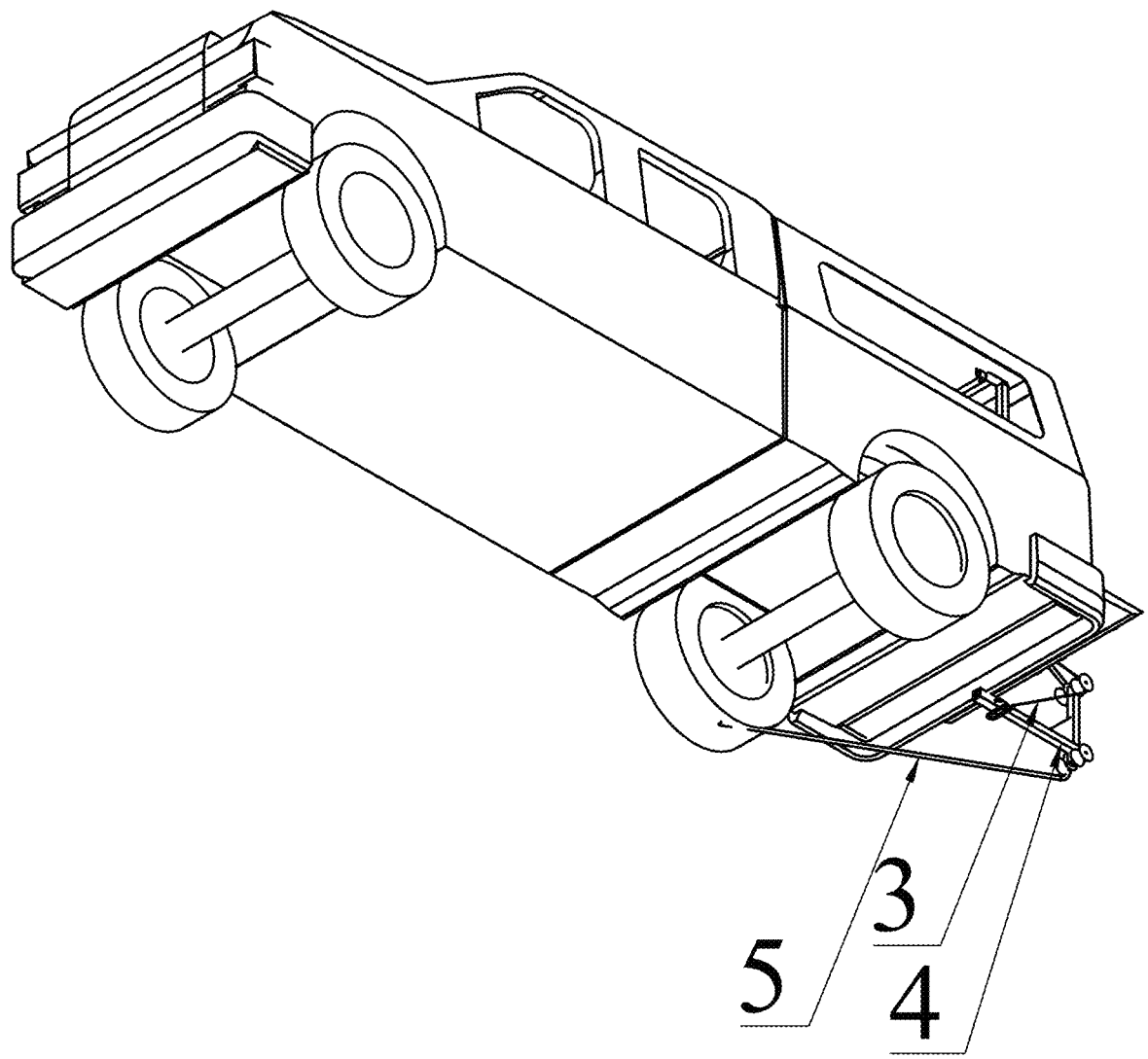
FIG. 2 illustrates a front bottom perspective view of the extraction hitch roller attachment and two configurations of extraction cables, ropes, or straps.
Figure 3:
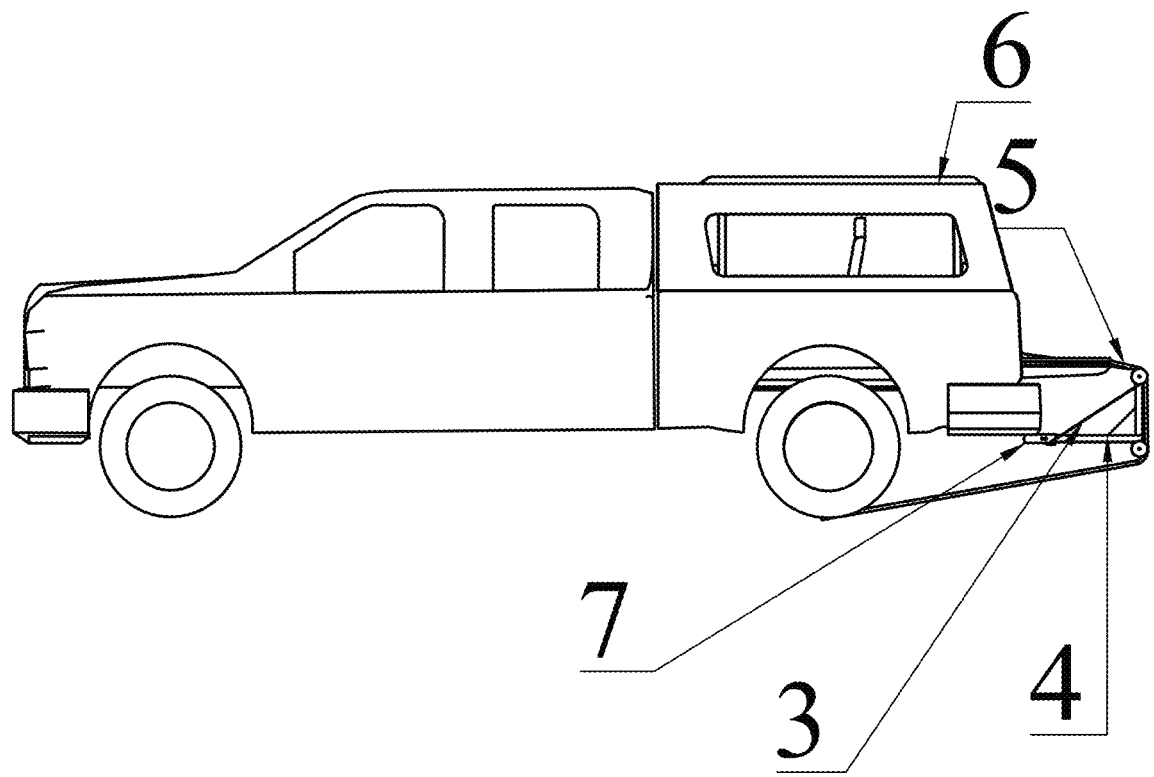
FIG. 3 illustrates a left side elevation view of a truck with installed modular truck bed compartment, tailgate situated in down position, two configurations of extraction cable, rope or straps, and extraction hitch roller attachment installed.
Figure 4:
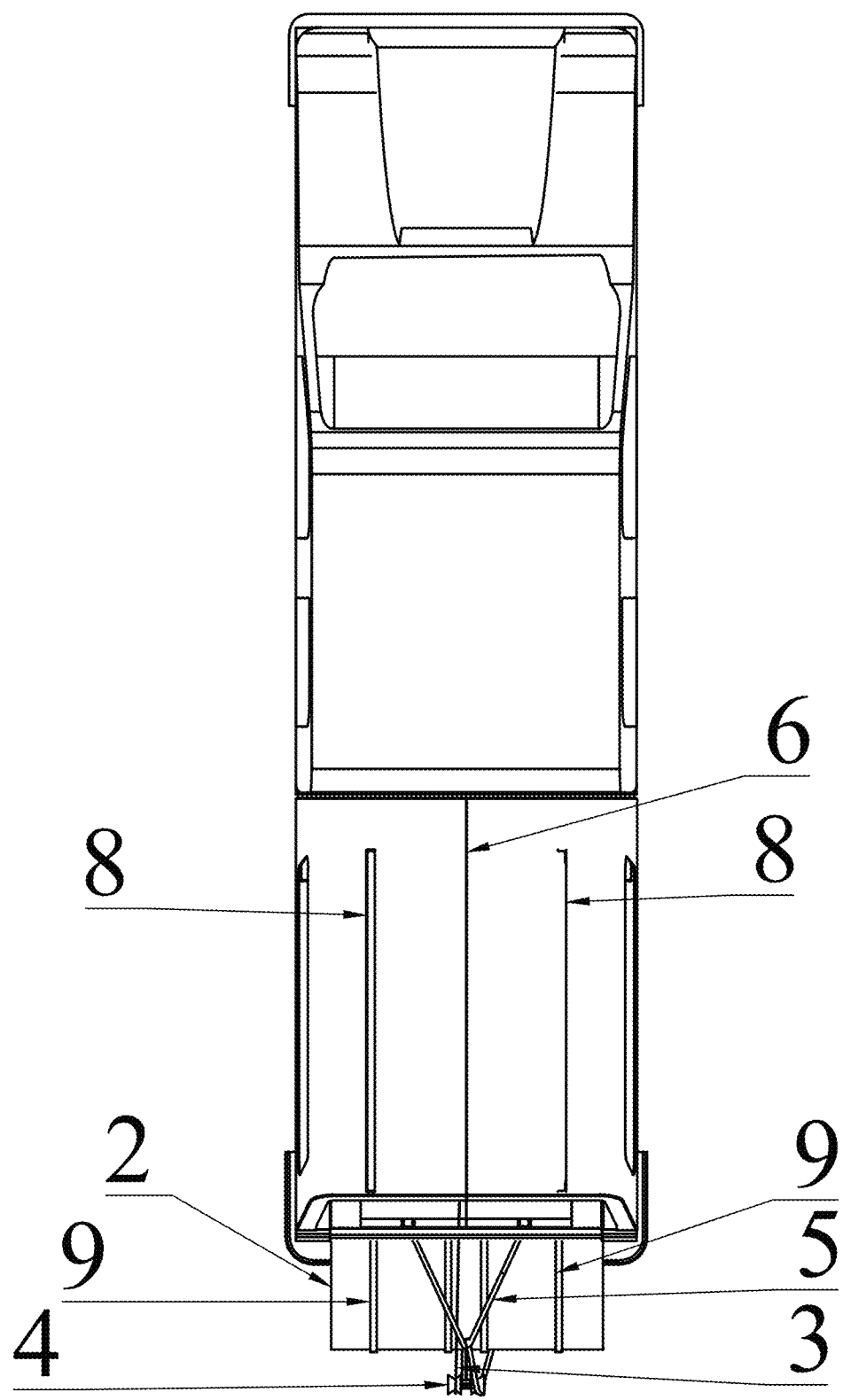
FIG. 4 illustrates the top view of a truck with installed modular truck bed compartment, tailgate situated in down position, extraction cable, rope or straps, and extraction hitch roller attachment installed.
Figure 5:
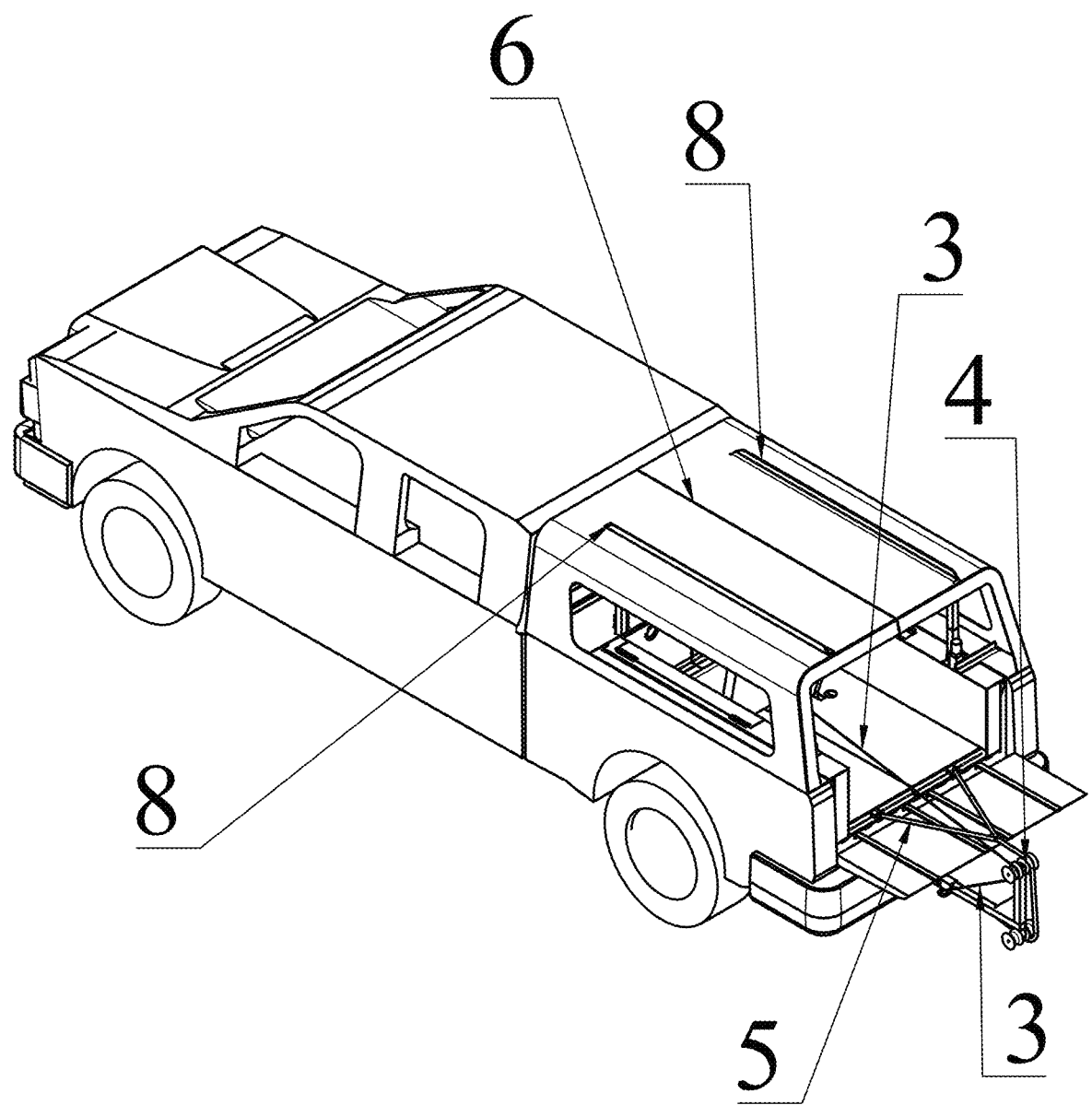
FIG. 5 illustrates a rear left top perspective view of a truck with installed modular truck bed compartment, tailgate situated in down position, extraction cable, rope or straps, and extraction hitch roller attachment installed.
Figure 6:
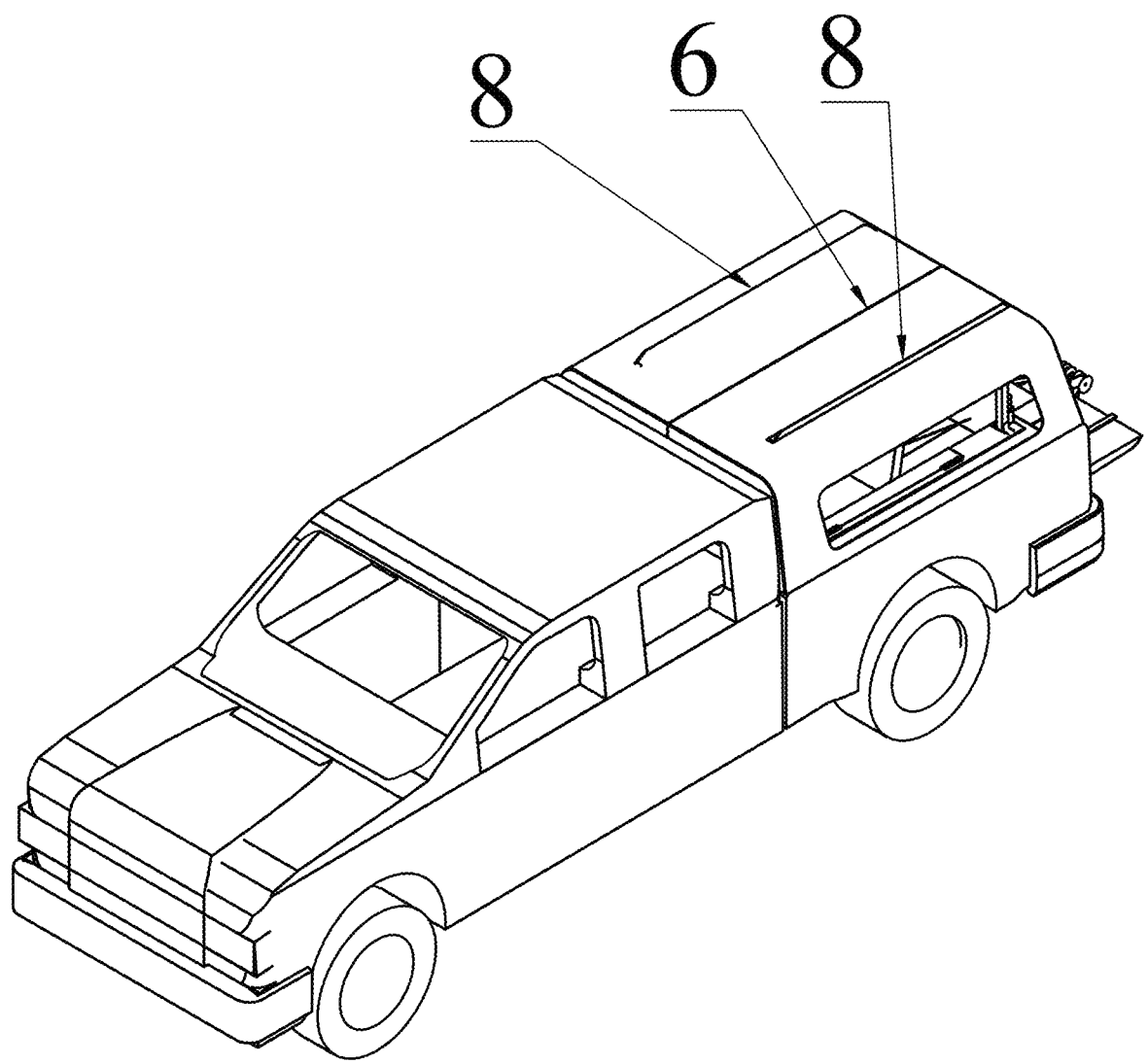
FIG. 6 illustrates a front top left perspective view of a truck with installed modular truck bed compartment, tailgate situated in down position, extraction cable, rope or straps, and extraction hitch roller attachment installed.
Figure 7:
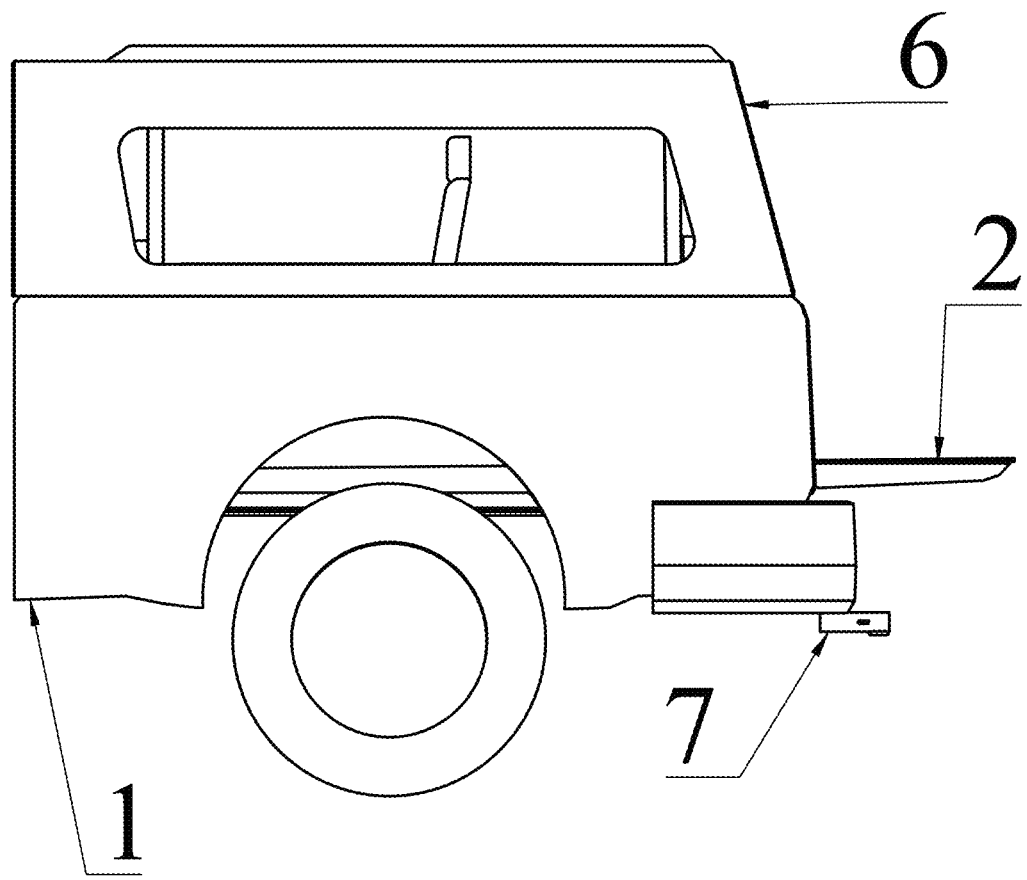
FIG. 7 illustrates a left side elevation view of a truck bed with tailgate in the down position and the modular truck bed compartment installed in the fully forward position relative to the truck bed.
Figure 8:
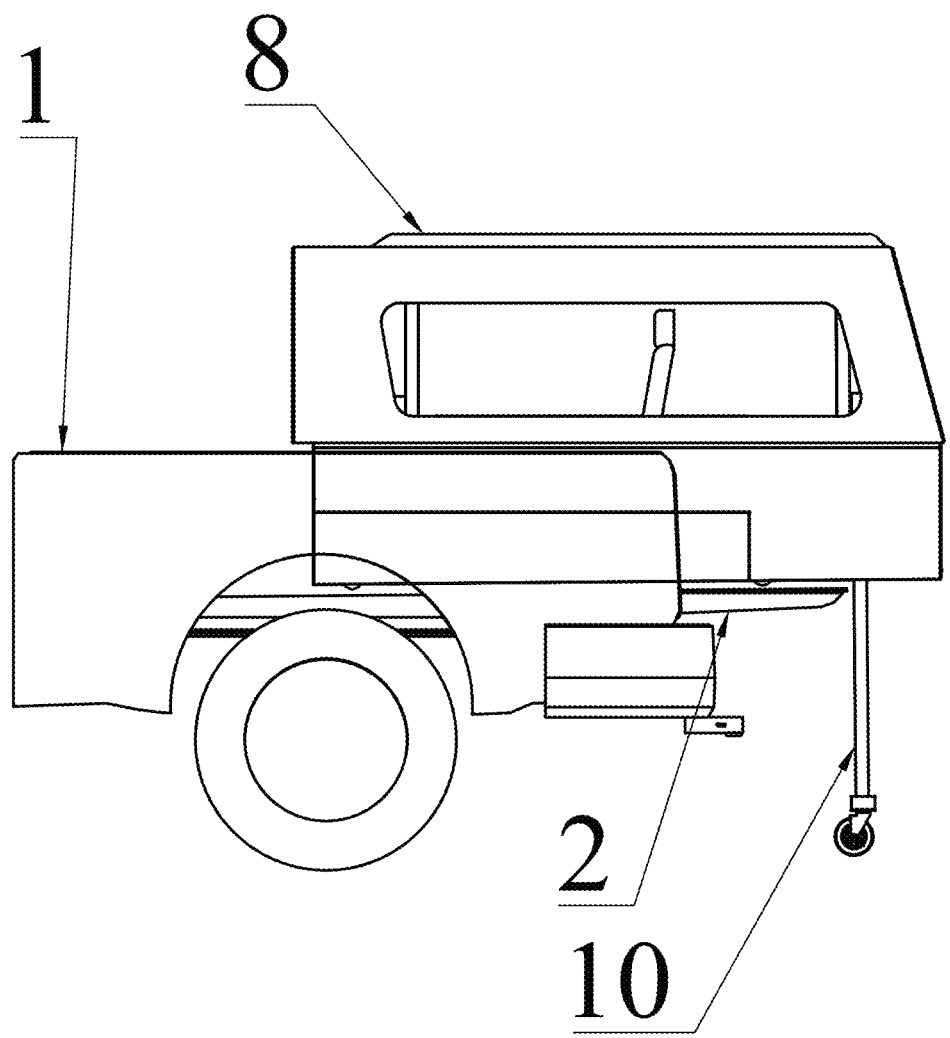
FIG. 8 illustrates a left side elevation view of a truck bed with tailgate in the down position, rear jack legs extended, and the modular truck bed compartment in a partially installed position relative to the truck bed.
Figure 9:
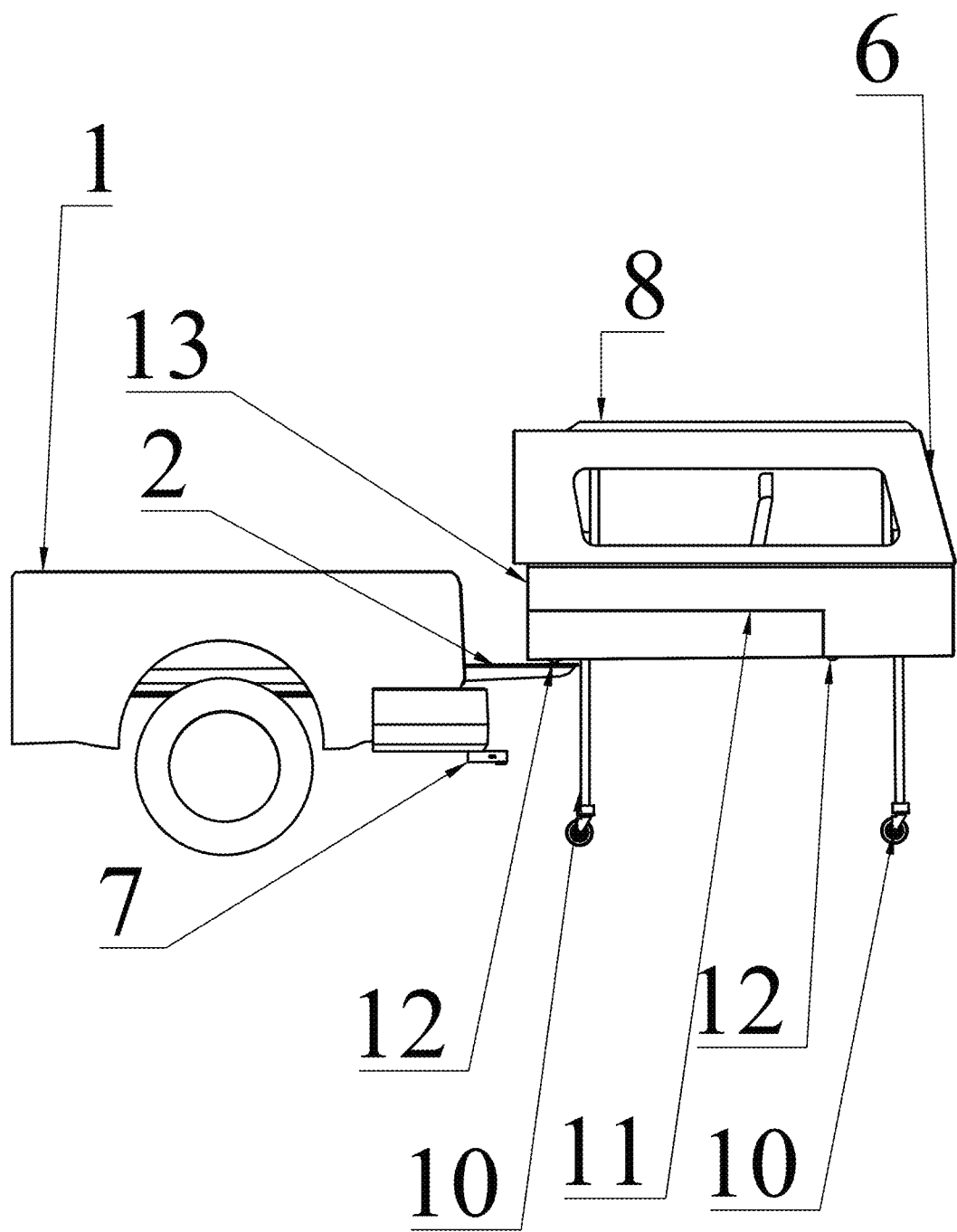
FIG. 9 illustrates a left side elevation view of a truck bed with tailgate in the down position, rear jack legs extended, forward jack legs extended, and the modular truck bed compartment in a fully un-installed position to the rear of the truck bed.
Figure 10:
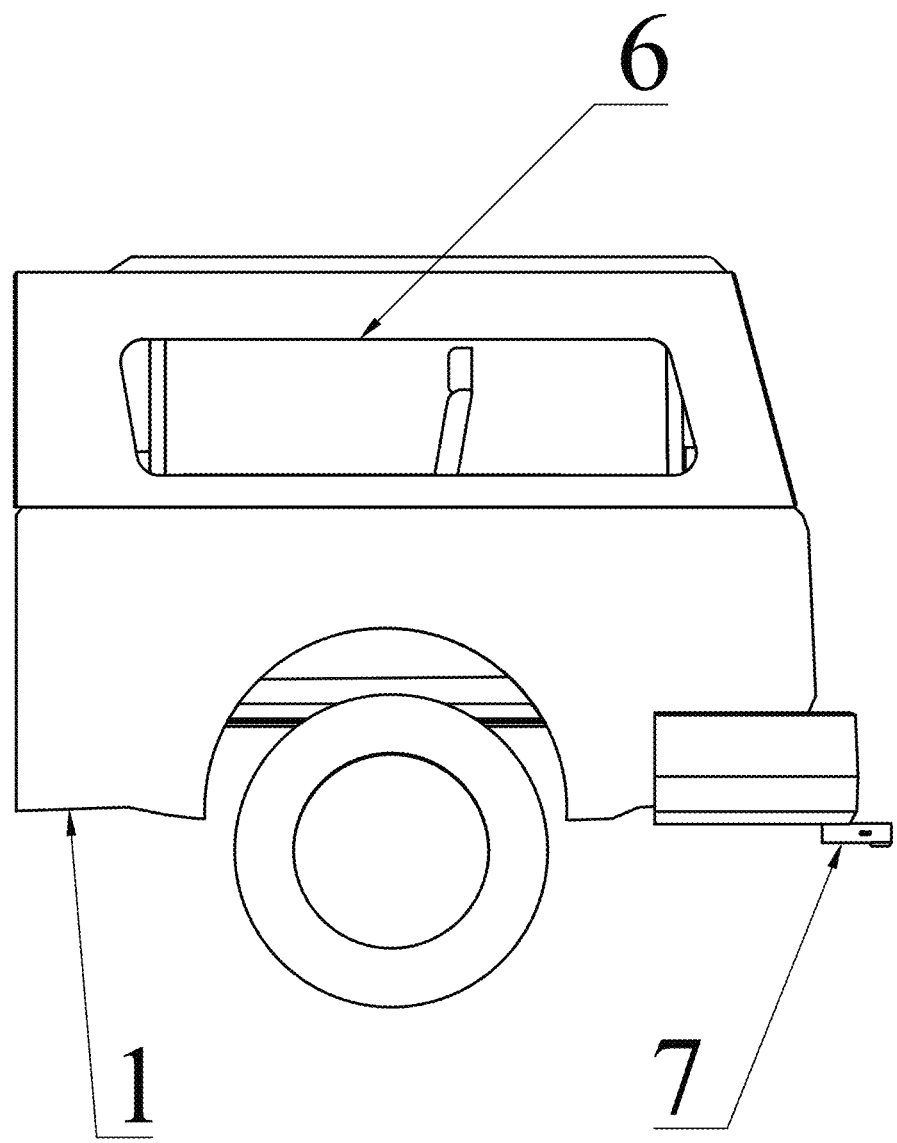
FIG. 10 illustrates a left side elevation view of a truck bed with tailgate removed and the modular truck bed compartment installed in the fully forward position relative to the truck bed.
Figure 11:
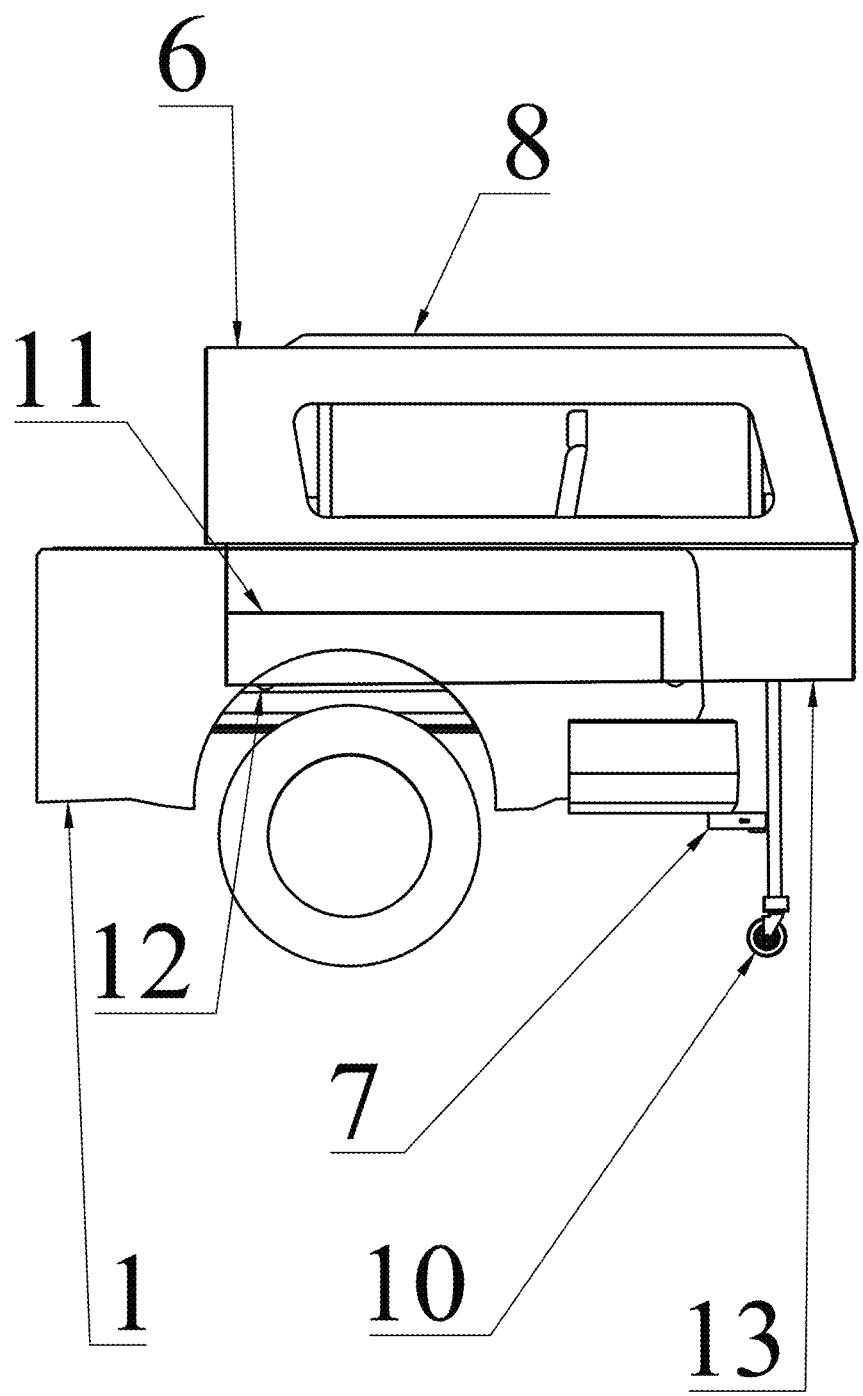
FIG. 11 illustrates a left side elevation view of a truck bed with tailgate removed, rear jack legs extended, and the modular truck bed compartment in a partially installed position relative to the truck bed.
Figure 12:
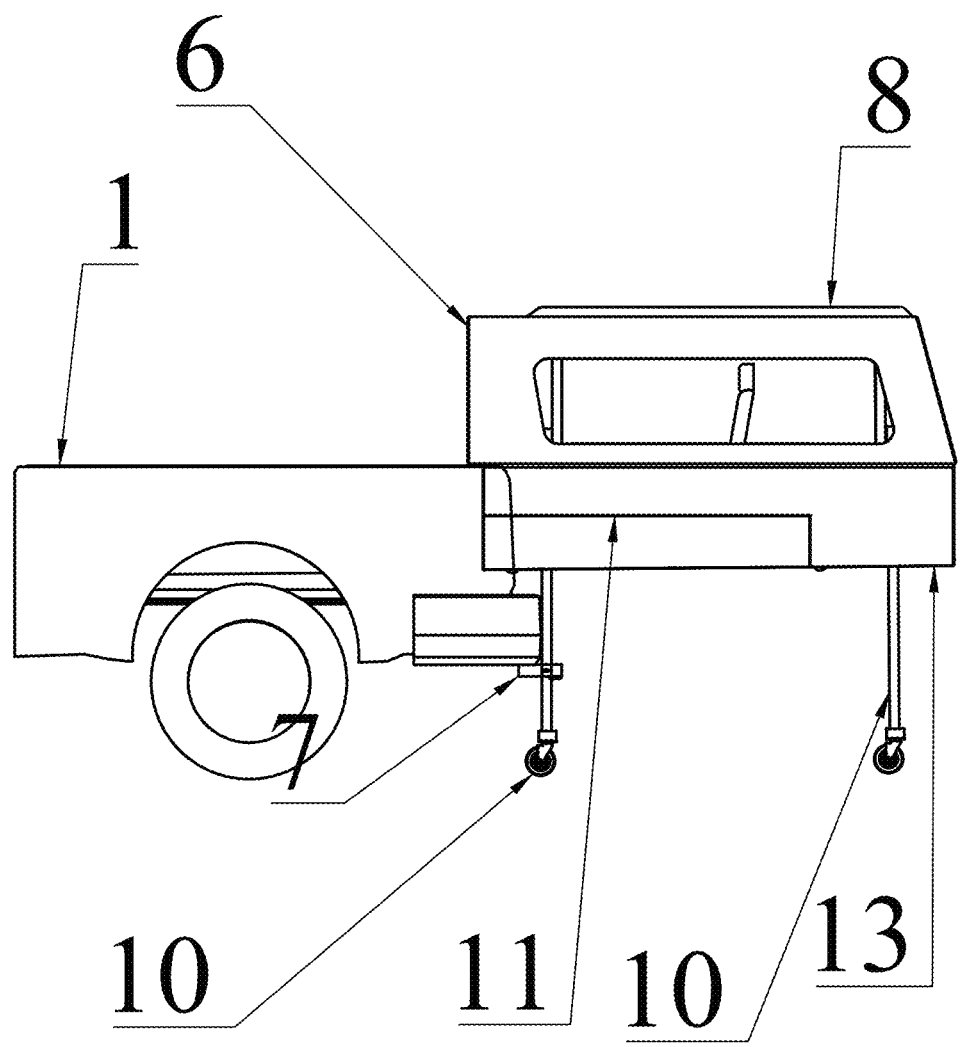
FIG. 12 illustrates a left side elevation view of a truck bed with tailgate removed, rear jack legs extended, forward jack legs extended, and the modular truck bed compartment in a fully un-installed position to the rear of the truck bed.
Figure 13:
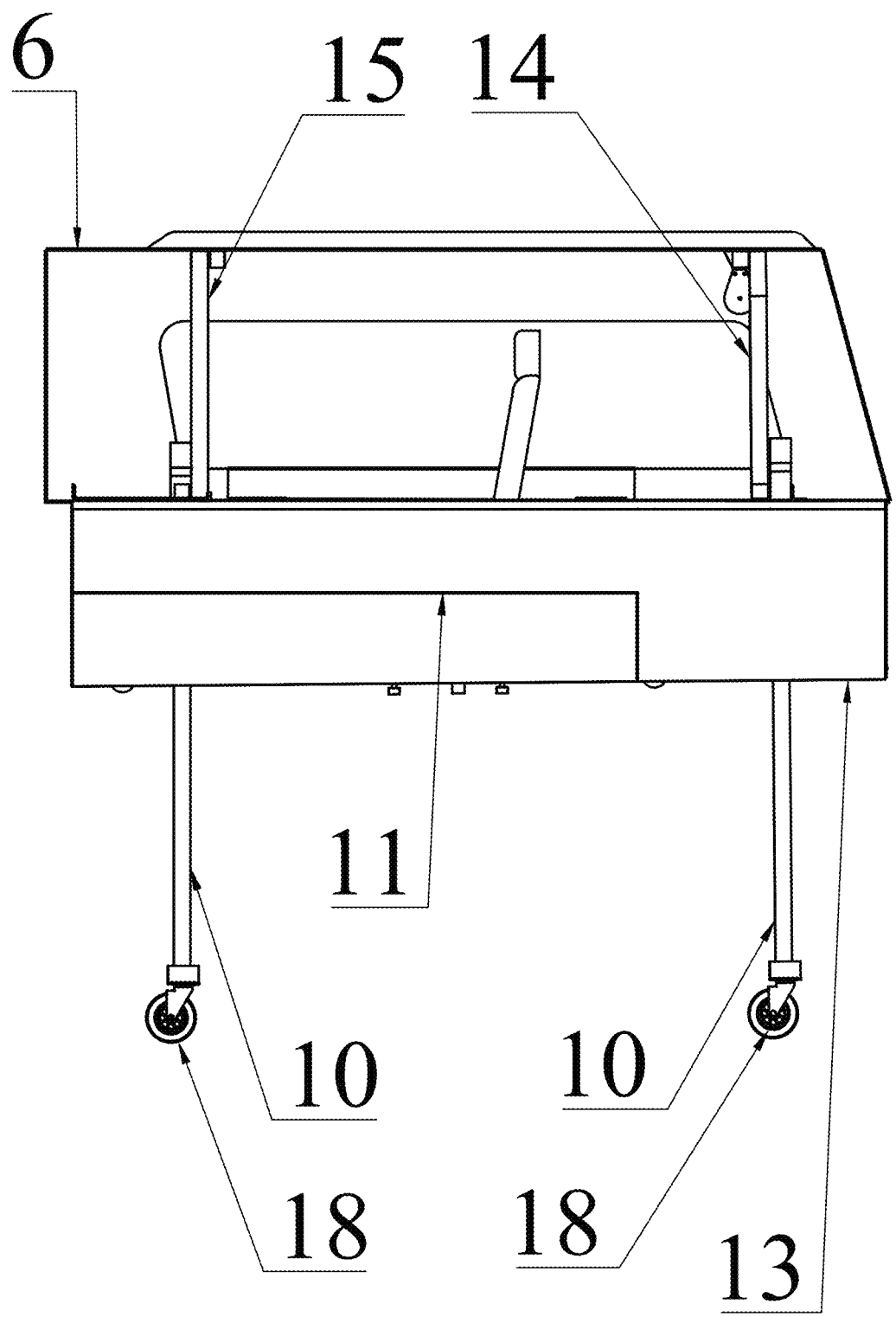
FIG. 13 illustrates a left side elevation view of the modular truck bed compartment standing alone with its weight supported by four jack legs. The left half of the truck cap roof portion of the compartment is removed for visibility of the interior chassis structure.
Figure 14:
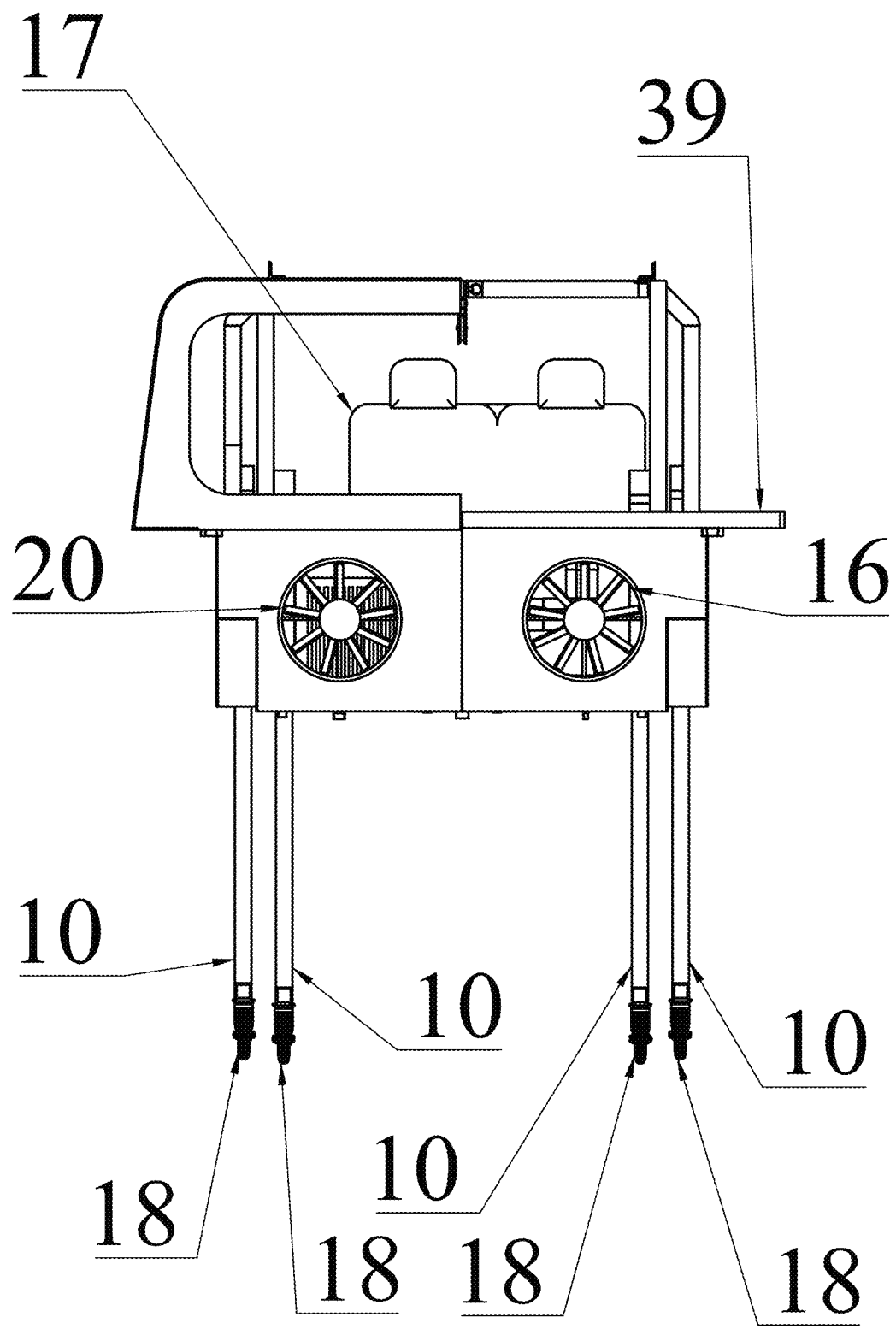
FIG. 14 illustrates a front elevation view of the modular truck bed compartment standing alone with its weight supported by four jack legs. The left half of the truck cap roof portion of the compartment is removed for visibility of the interior chassis structure and seat.
Figure 15:
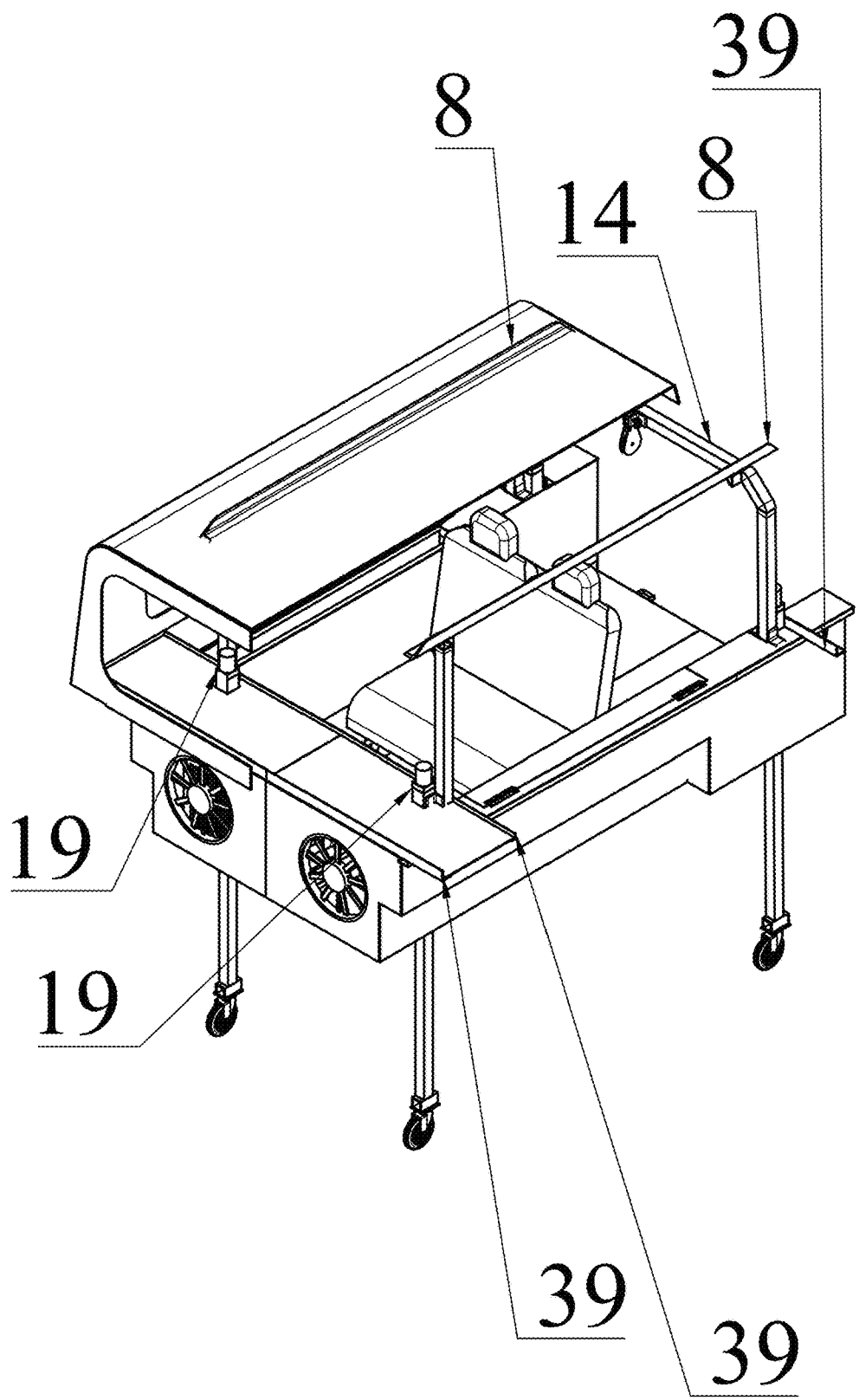
FIG. 15 illustrates a top front left perspective view of the modular truck bed compartment standing alone with its weight supported by four jack legs. The left half of the truck cap roof portion of the compartment is removed for visibility of the interior chassis structure and seat.
Figure 16:
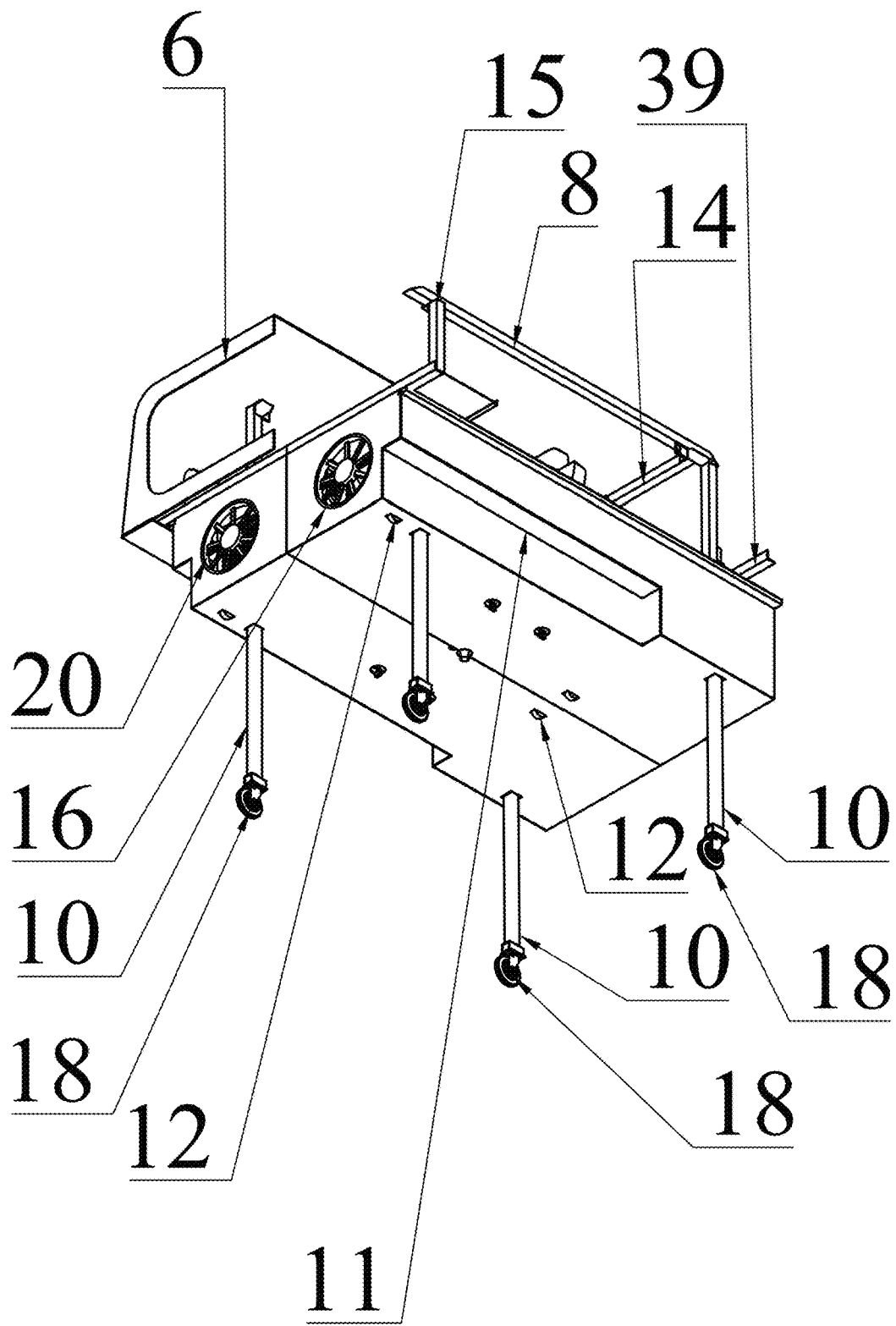
FIG. 16 illustrates a bottom front left perspective view of the modular truck bed compartment standing alone with its weight supported by four jack legs. The left half of the truck cap roof portion of the compartment is removed for visibility of the interior chassis structure and seat.
Figure 17:
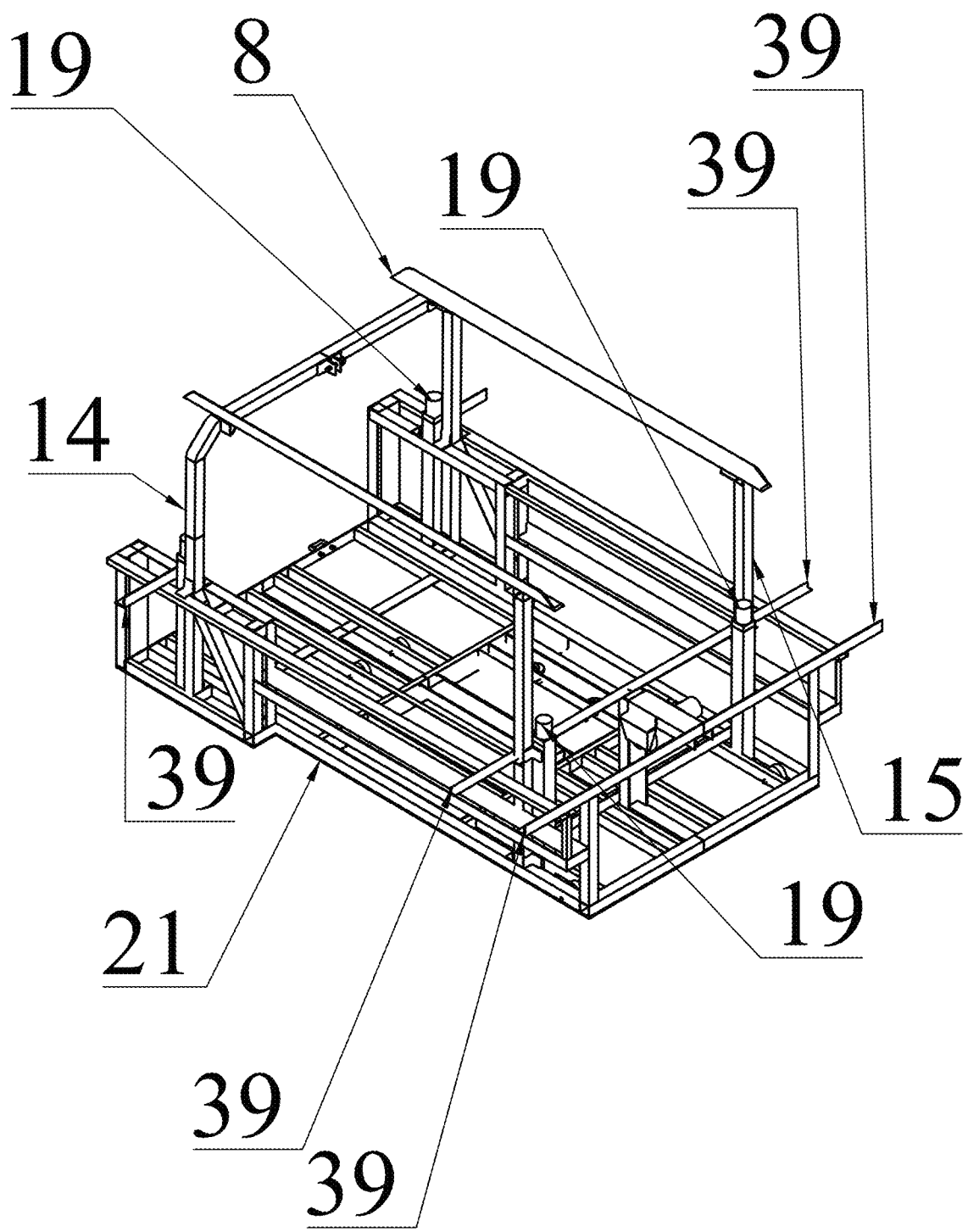
FIG. 17 illustrates a top right front perspective view of the truck bed compartment's metal chassis structure including the four jack legs, hitch adaptor frame, and electric winch.
Figure 18:
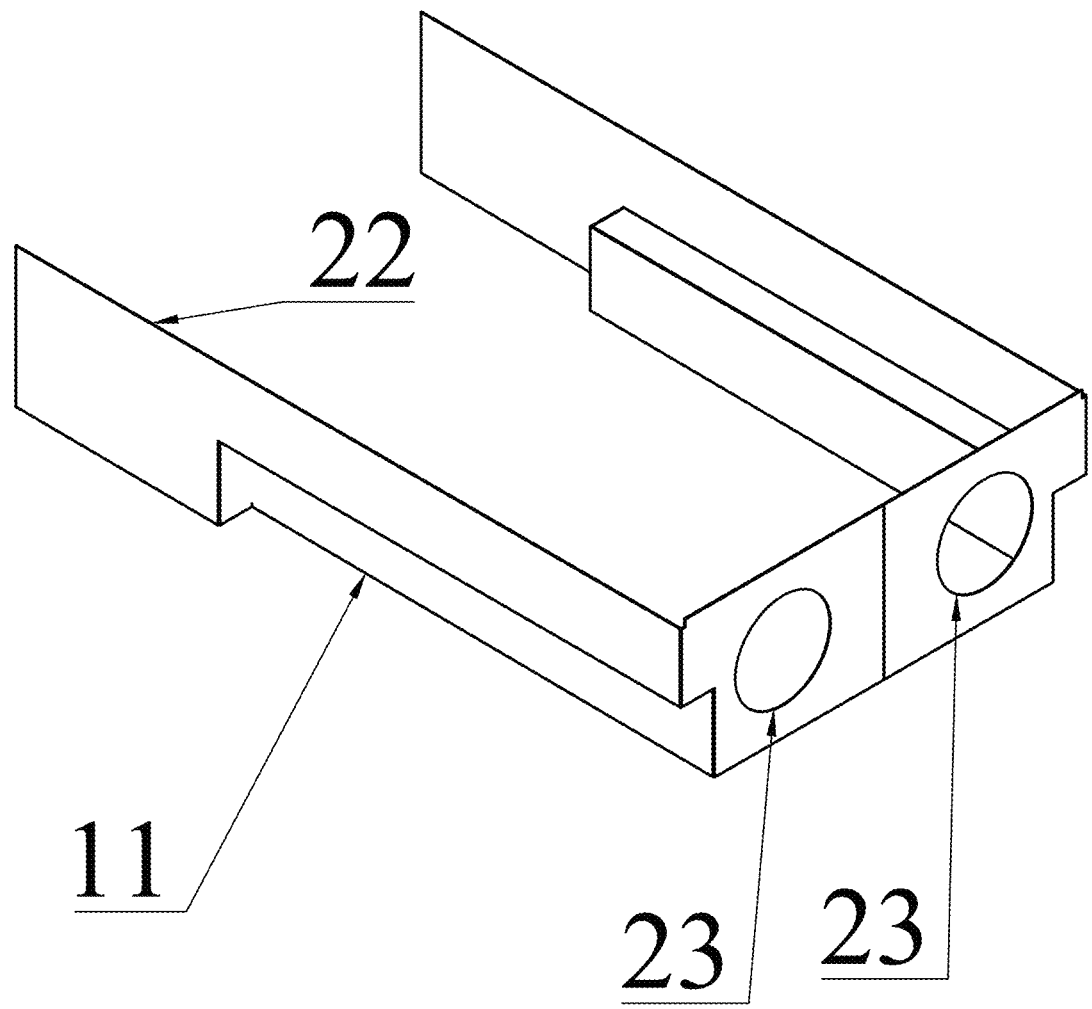
FIG. 18 illustrates a top right front perspective view of the outer tub component by itself.
Figure 19:
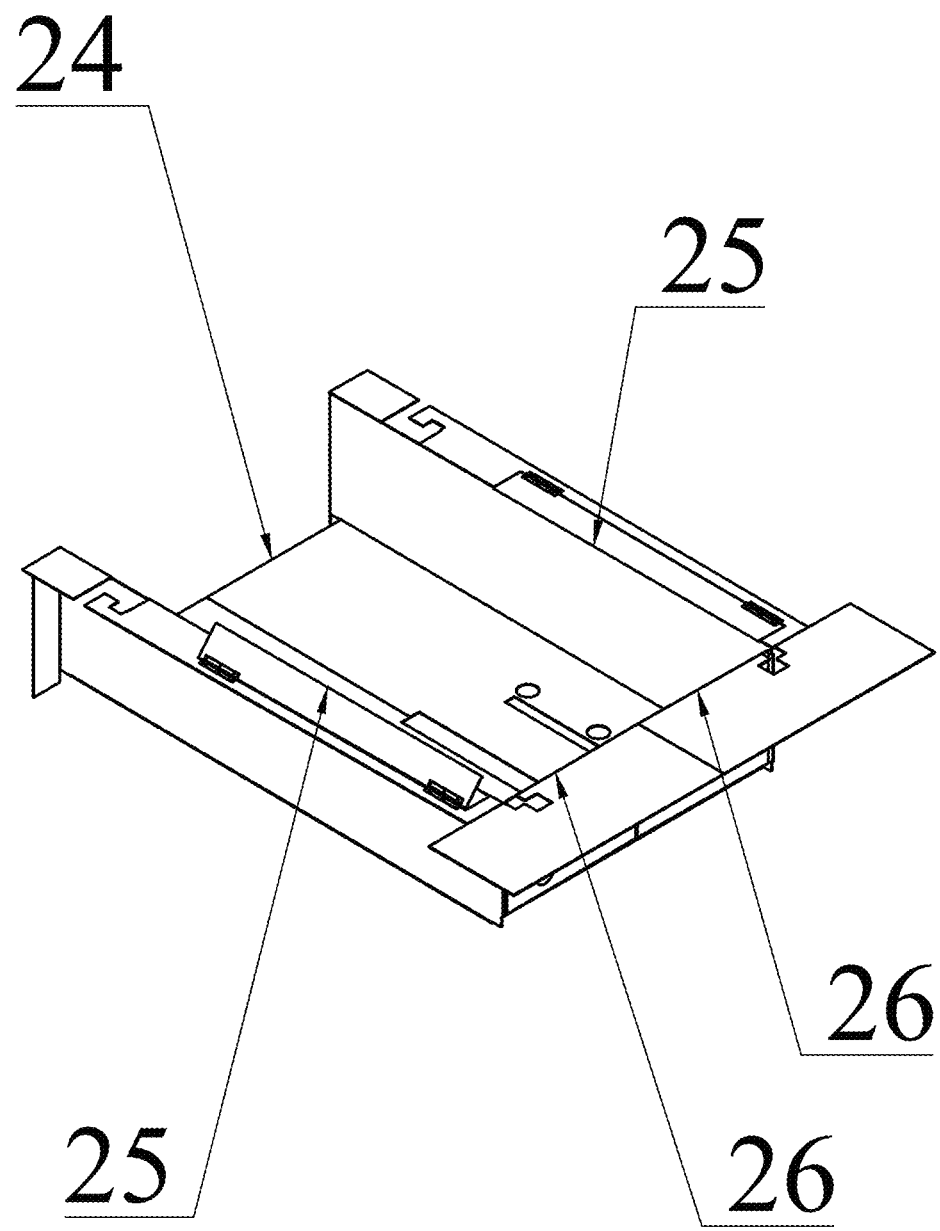
FIG. 19 illustrates a top right front perspective view of the inner tub assembly including side compartment lids.
Figure 20:
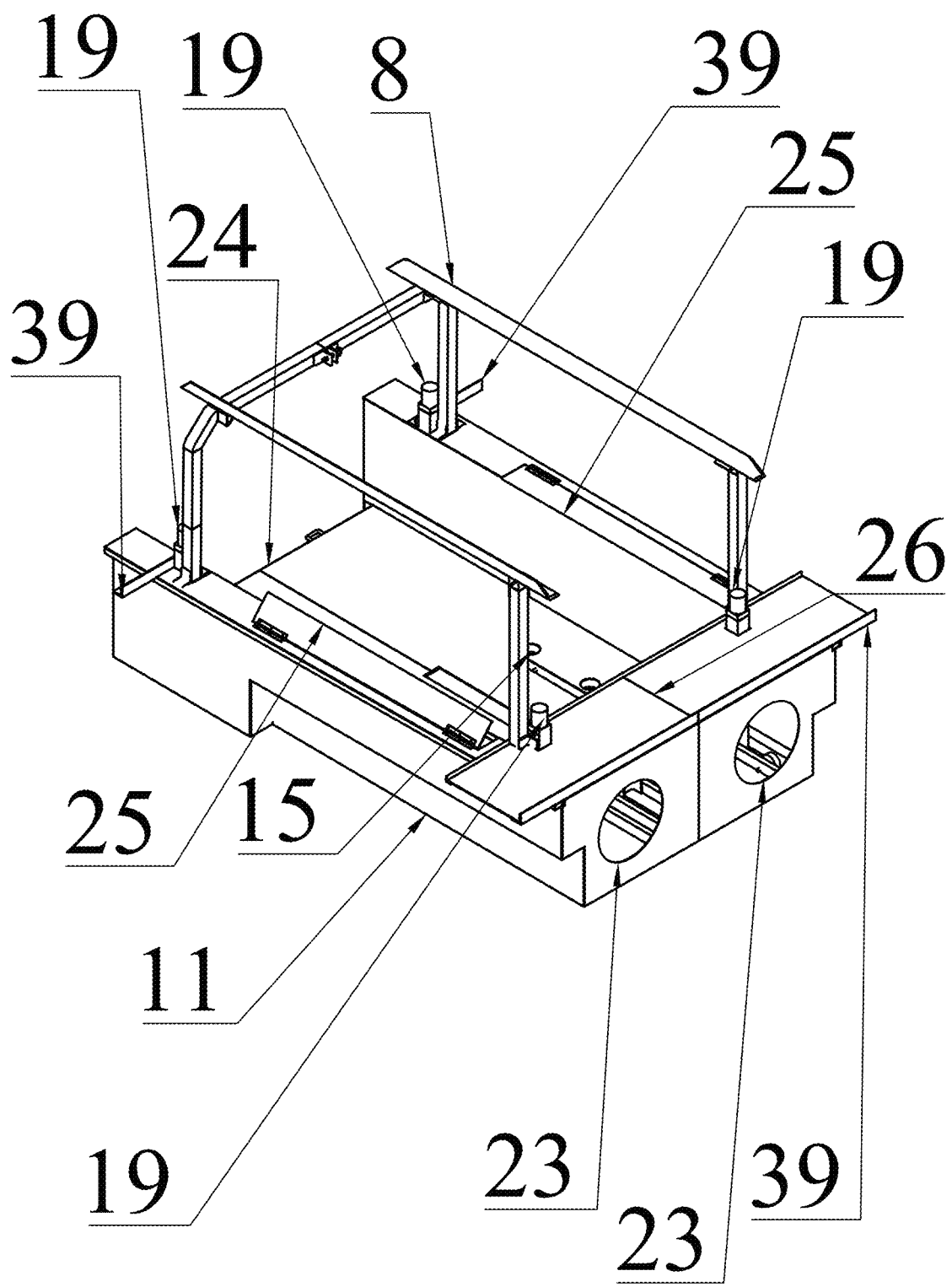
FIG. 20 illustrates a top right front perspective view of the chassis, inner tub, and outer tub in an assembled configuration.
Figure 21:
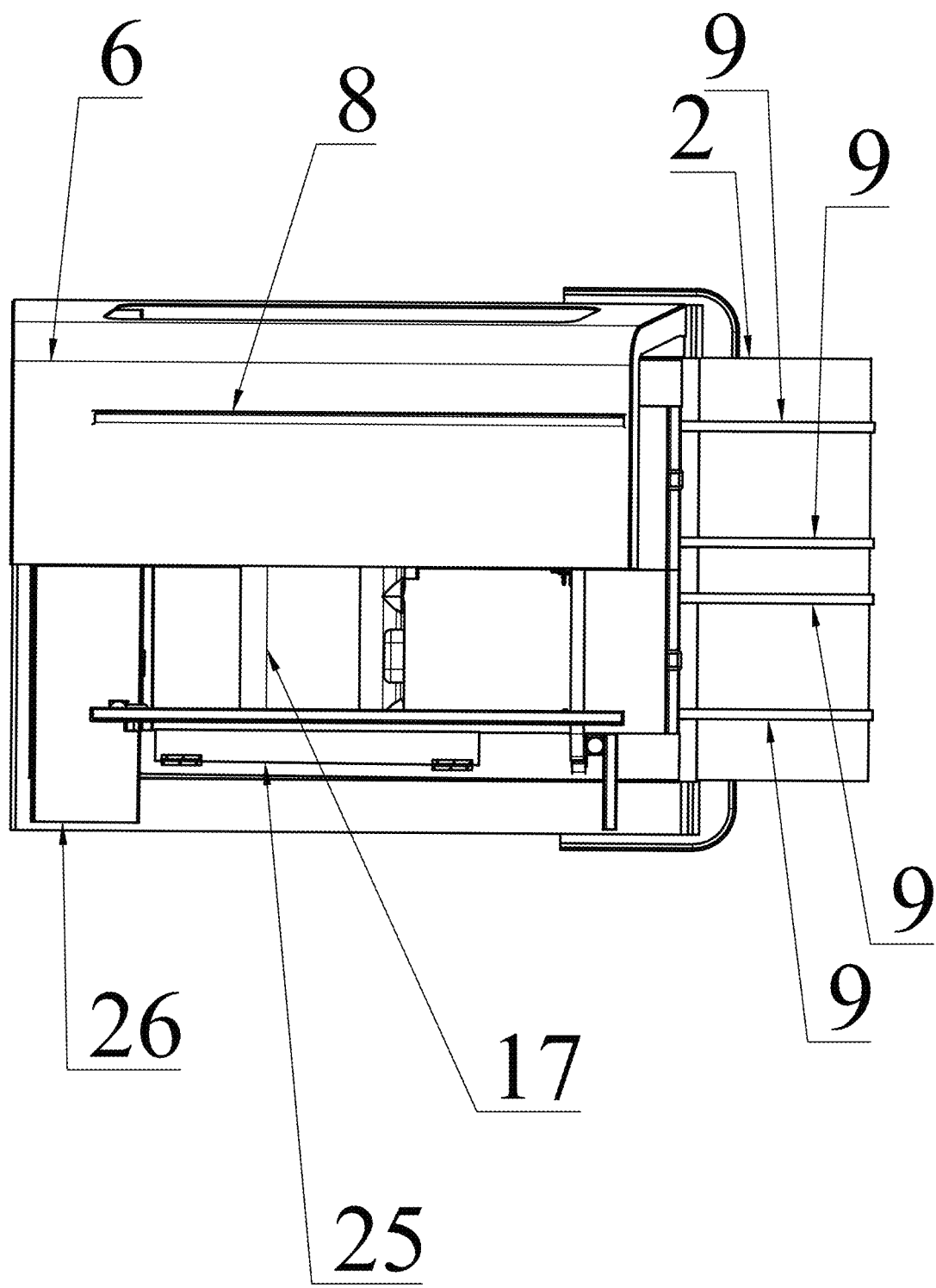
FIG. 21 illustrates a top view of the modular truck bed compartment fully installed in a truck bed with tailgate down. The left half of the truck cap roof portion of the compartment is removed for visibility of the interior chassis structure and seat.
Figure 22:
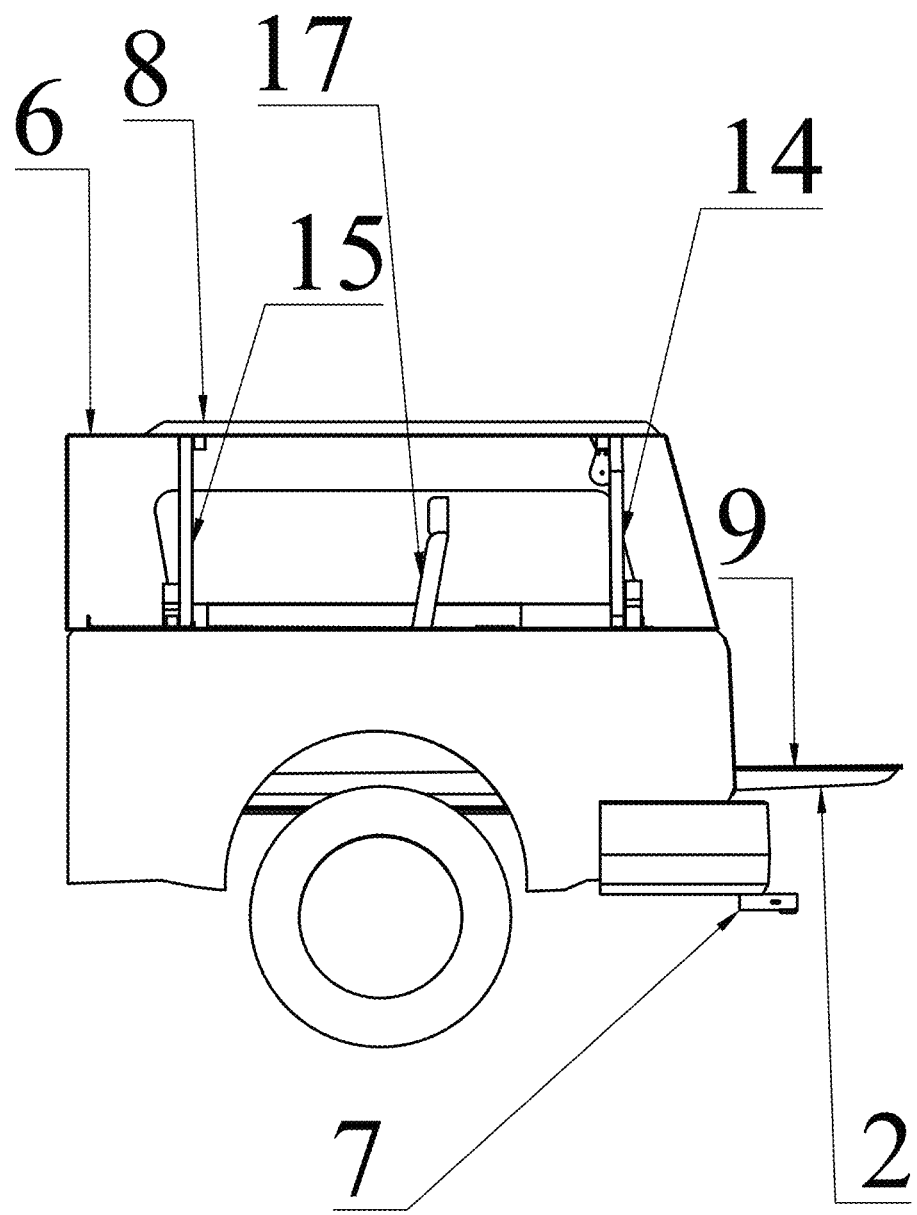
FIG. 22 illustrates a left side elevation view of the modular truck bed compartment fully installed in a truck bed with tailgate down. The left half of the truck cap roof portion of the compartment is removed for visibility of the interior chassis structure and seat.
Figure 23:
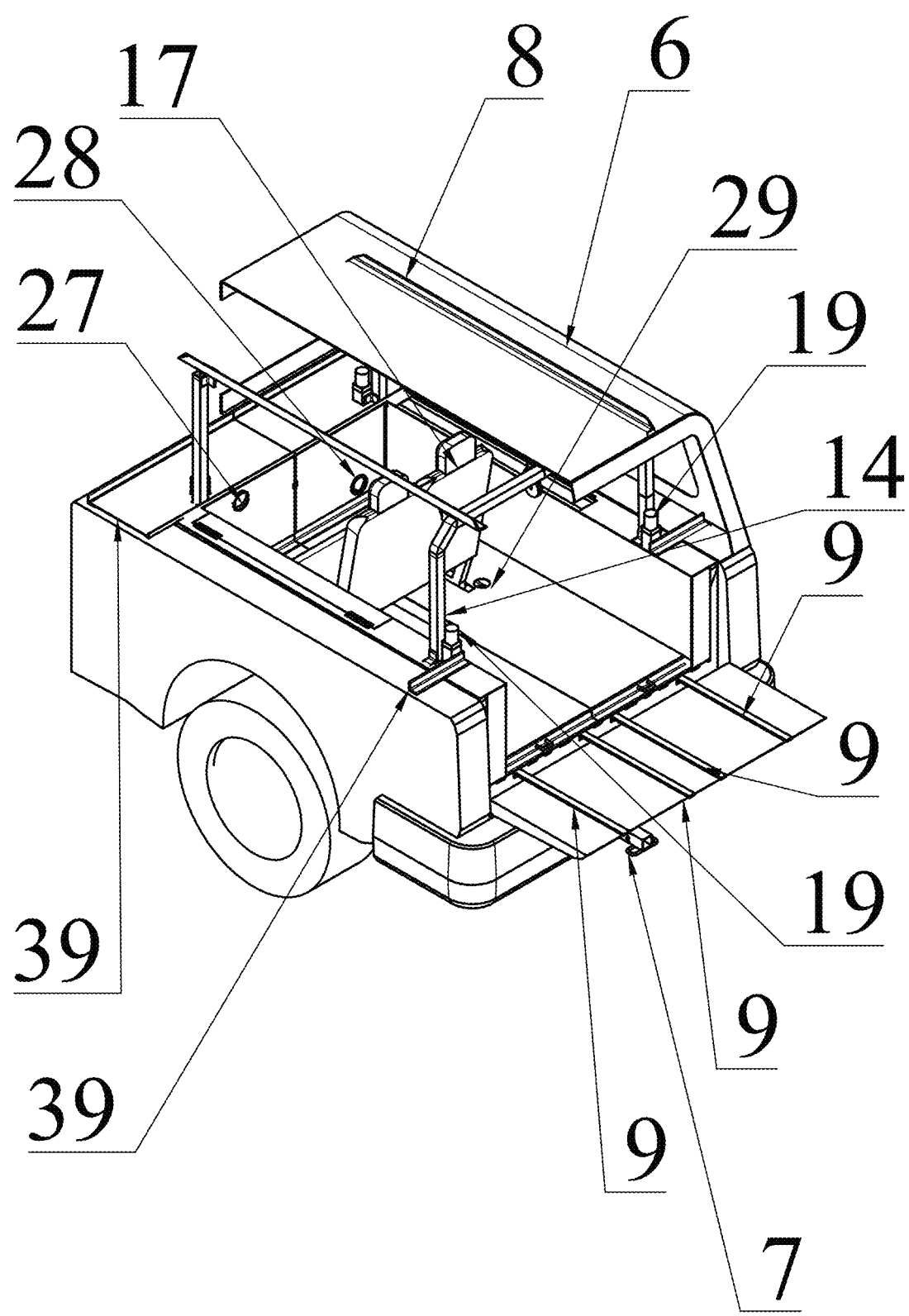
FIG. 23 illustrates a top left rear perspective view of the modular truck bed compartment fully installed in a truck bed with tailgate down. The left half of the truck cap roof portion of the compartment is removed for visibility of the interior chassis structure and seat.
Figure 24:
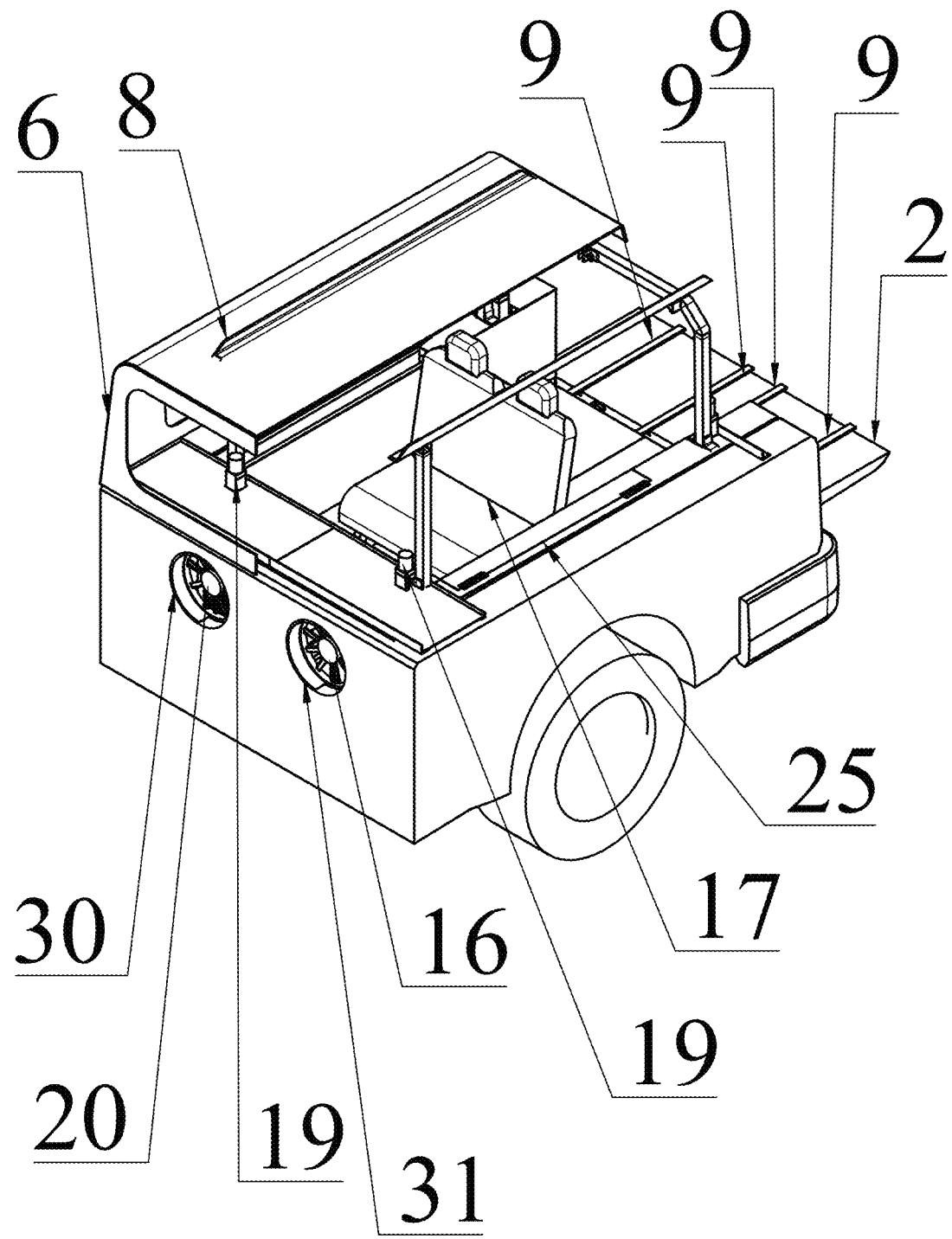
FIG. 24 illustrates a top left front perspective view of the modular truck bed compartment fully installed in a truck bed with tailgate down. The left half of the truck cap roof portion of the compartment is removed for visibility of the interior chassis structure and seat. The modular truck bed compartment has HVAC installed.
Figure 25:
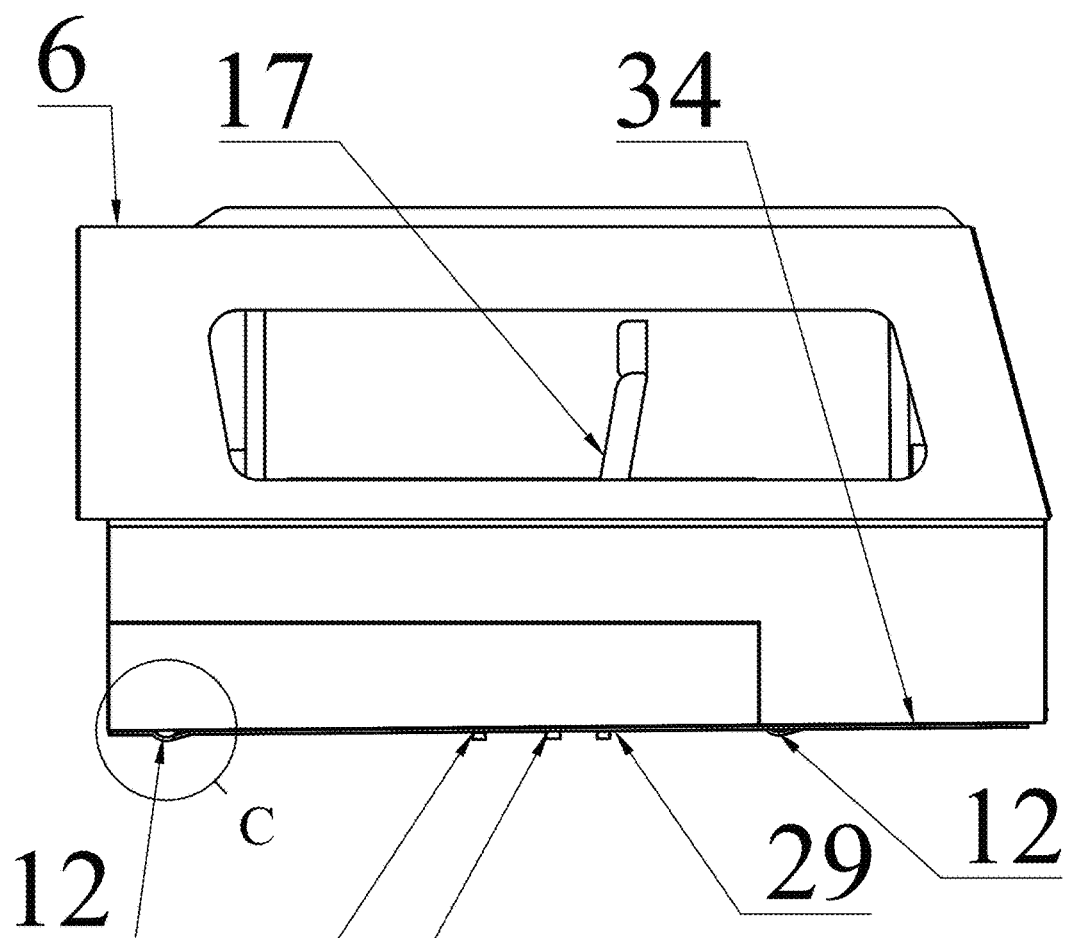
FIG. 25 illustrates a left side elevation of the modular truck bed compartment without jack legs installed and truck bed tracks in position along the bottom face of the compartment as it would be arranged inside a truck bed.
Figure 26:
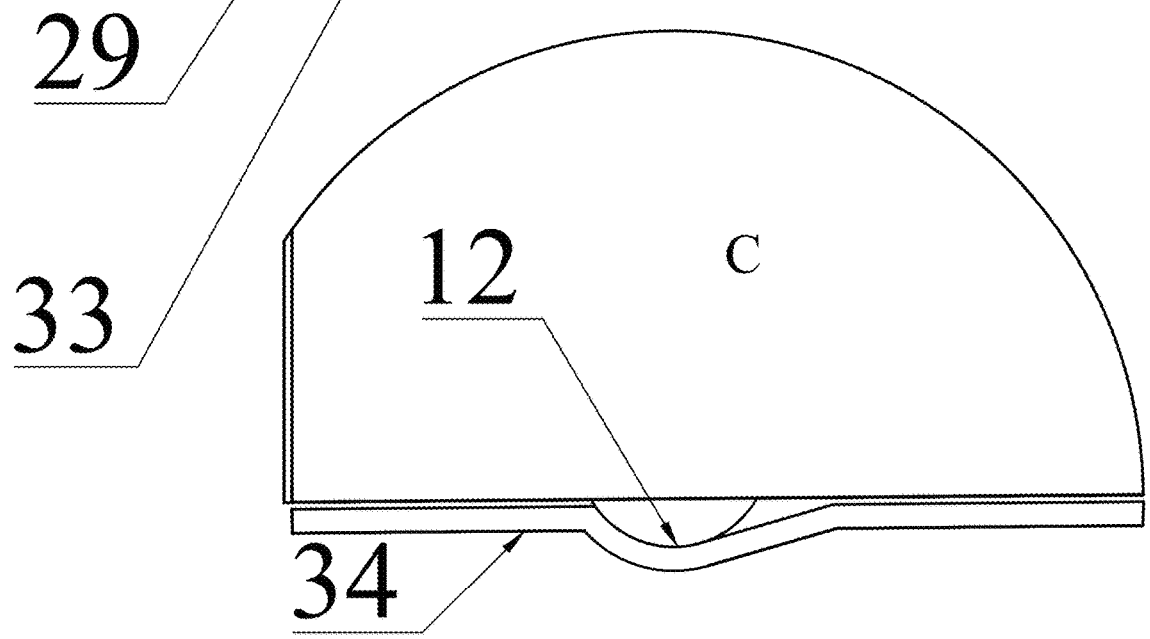
FIG. 26 illustrates a zoomed view of the front bottom corner of FIG. 25 to illustrate the roller wheel and truck bed track geometries and interface.
Figure 27:
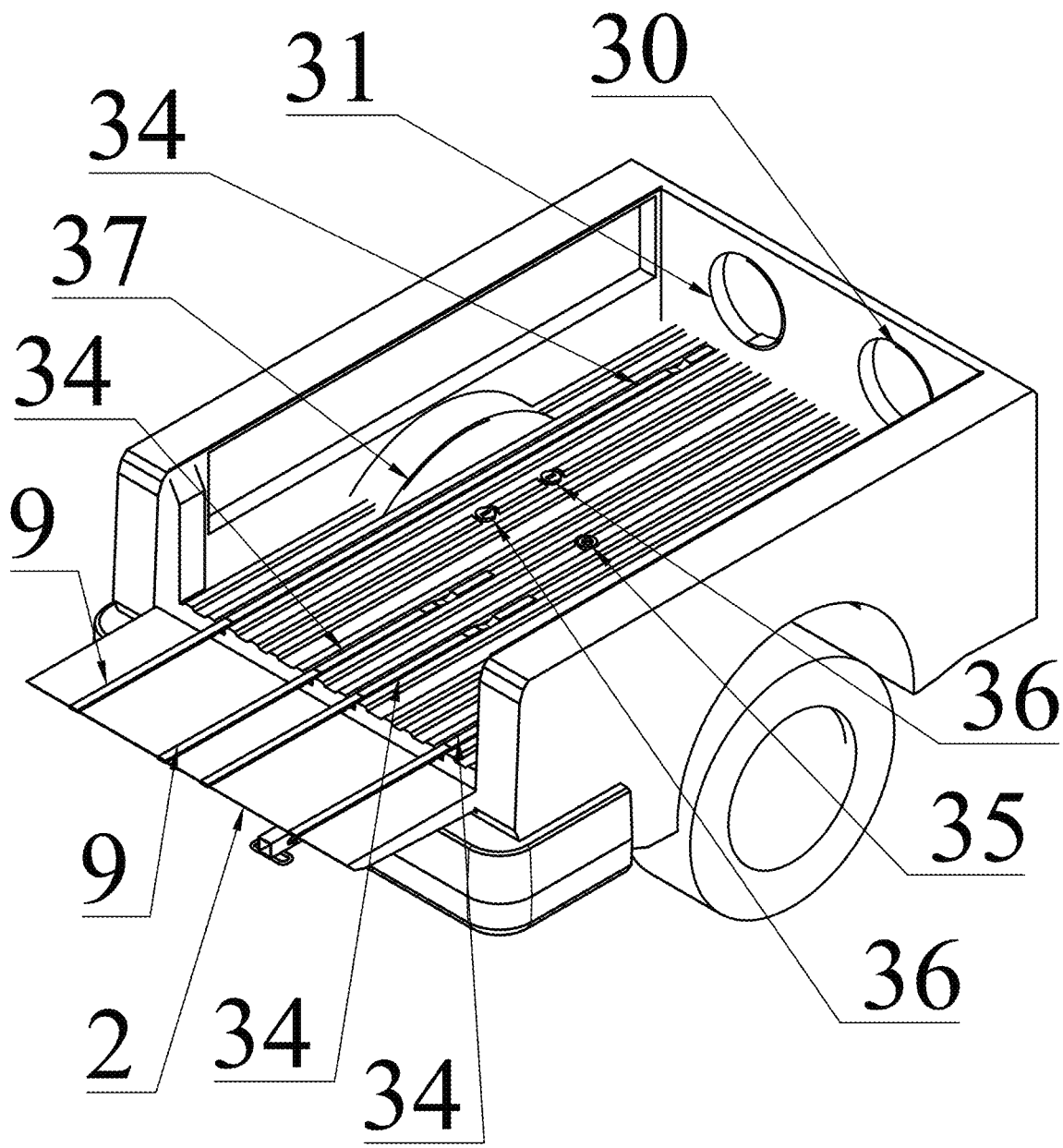
FIG. 27 illustrates a truck bed with tailgate down and truck bed tracks installed in the bottom of the bed and on the top face of the tailgate. HVAC plenum fan cutouts are illustrated at the front of the truck bed.
Figure 28:
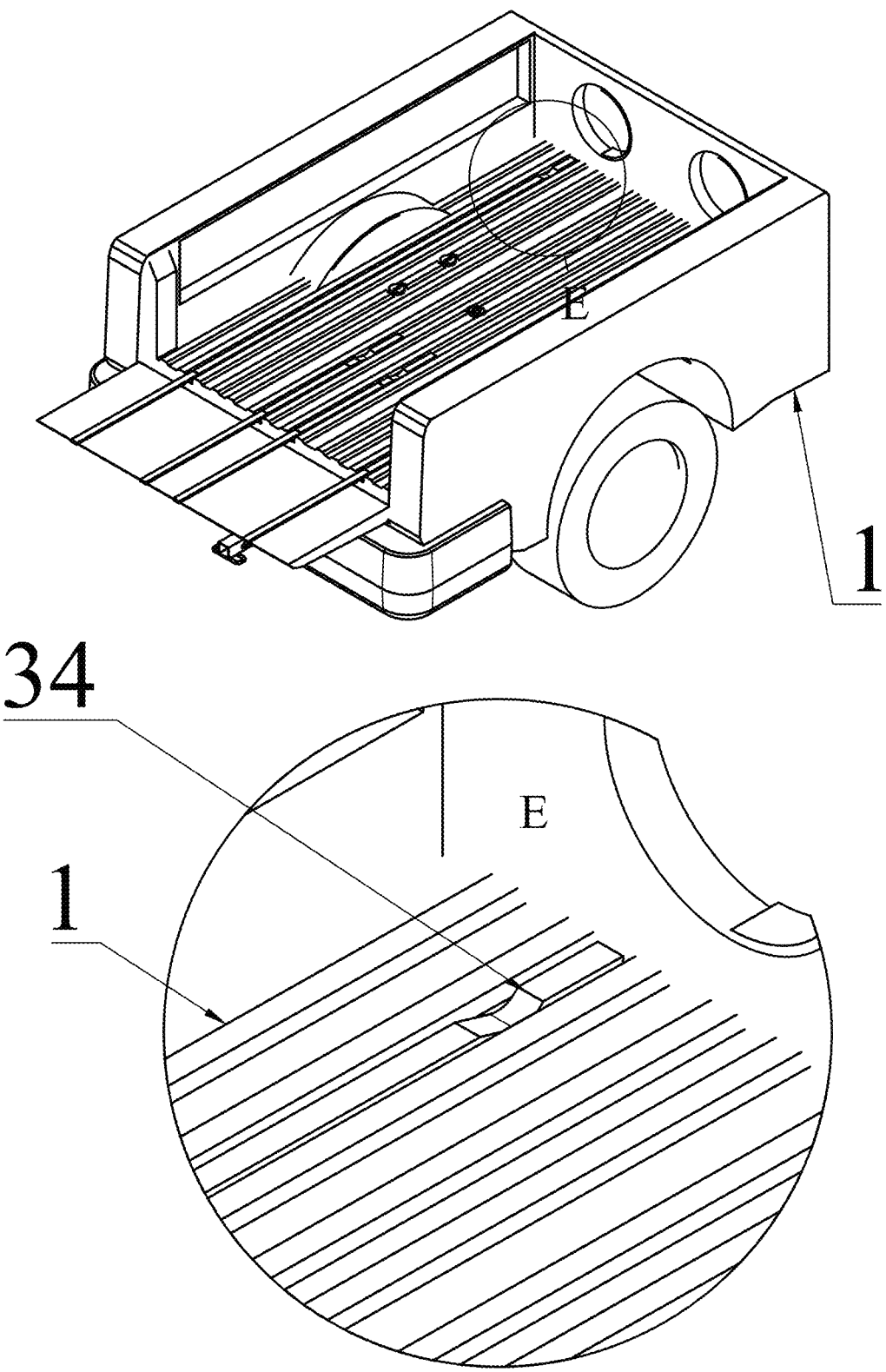
FIG. 28 illustrates a zoomed view of FIG. 27 to depict the section of the front left truck bed track inset on the corrugated truck bed floor with the pocket for the front left roller wheel.
Figure 29:
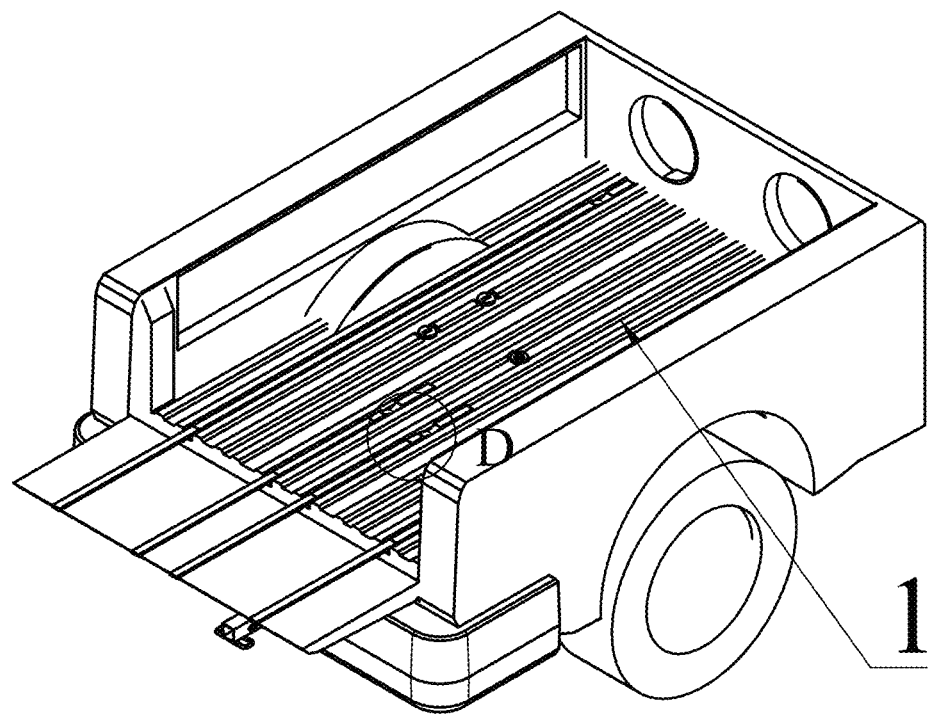
FIG. 29 illustrates a zoomed view of FIG. 27 to depict the center truck bed tracks inset on the corrugated truck bed floor with the pocket for the front left roller wheel.
Figure 29:
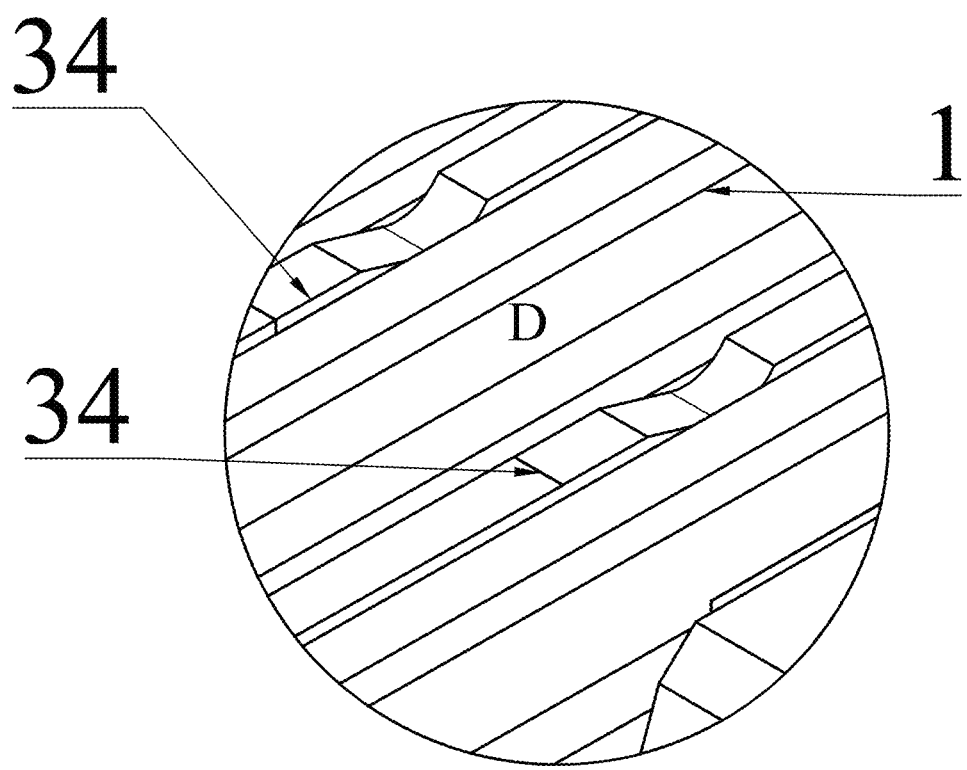
Figure 30:
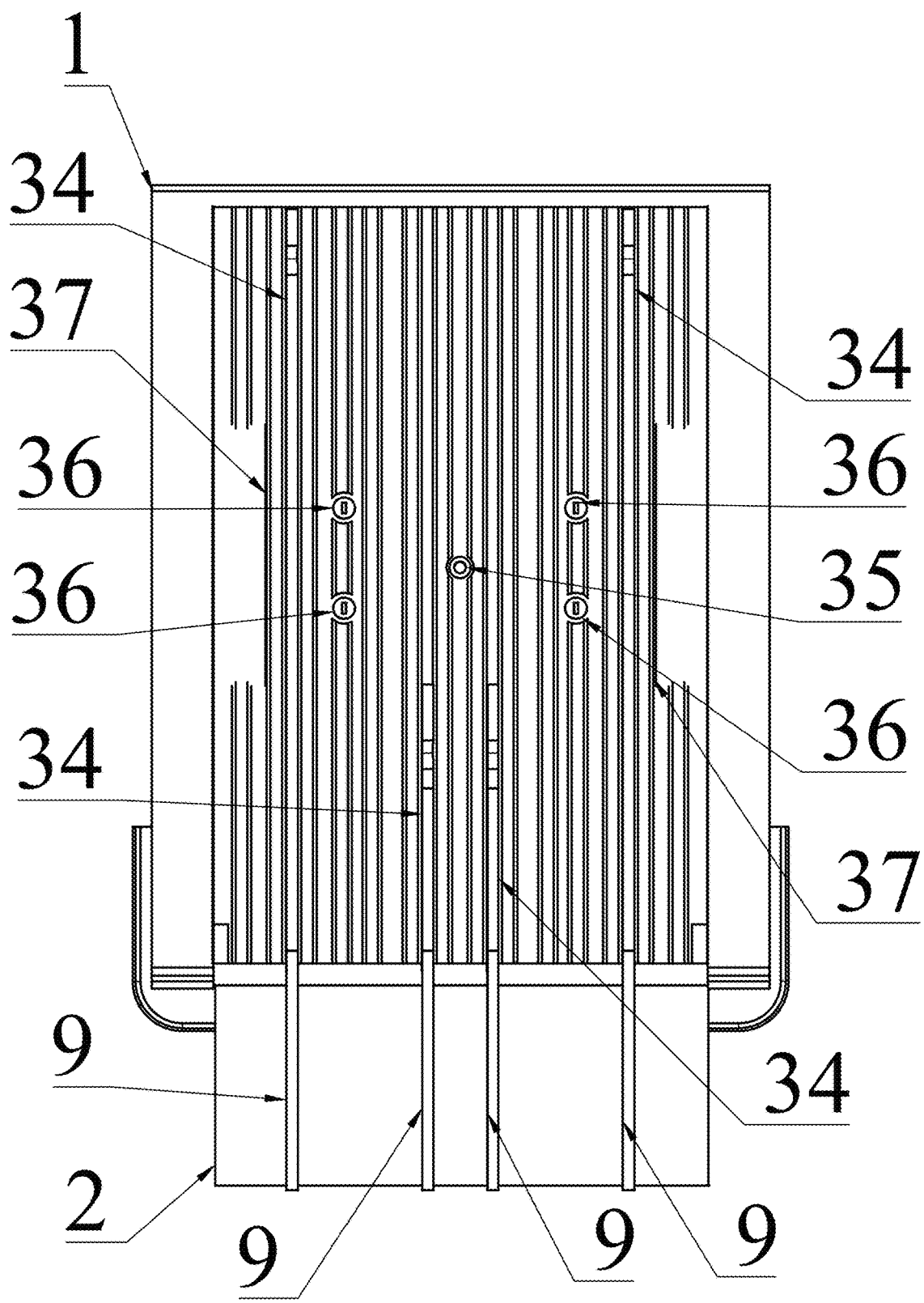
FIG. 30 illustrates a top view of a truck bed with tailgate down, truck bed and tailgate roller tracks installed, and an under-bed hitch mounting system installed under the truck bed for gooseneck or fifth wheel hitches.
Figure 31:
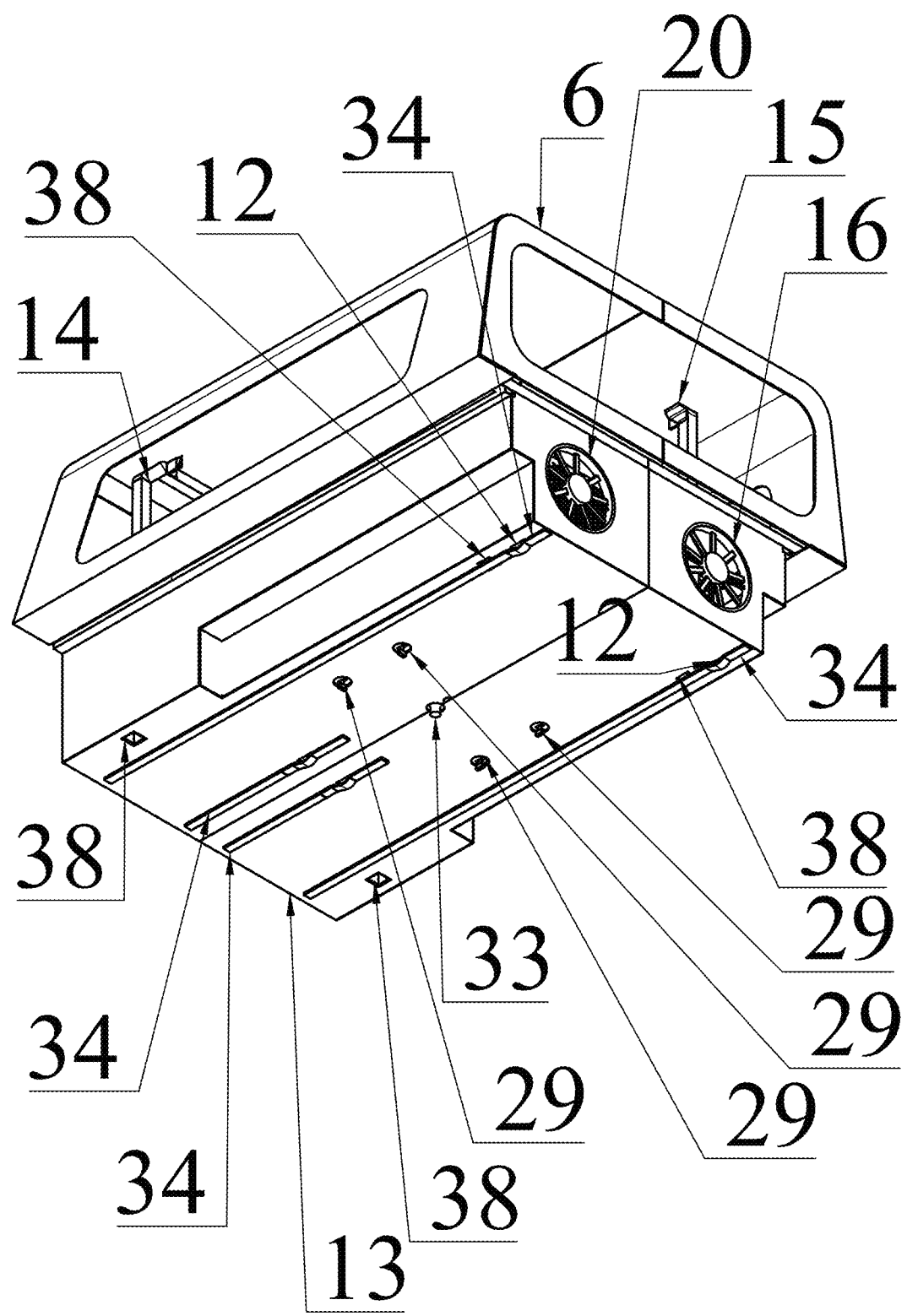
FIG. 31 illustrates a front bottom right perspective view of the modular truck bed compartment without jack legs installed, underbed hitch attach fittings in place, HVAC installed, and truck bed tracks in position along the bottom face of the compartment as it would be arranged inside a truck bed.
Figure 32:
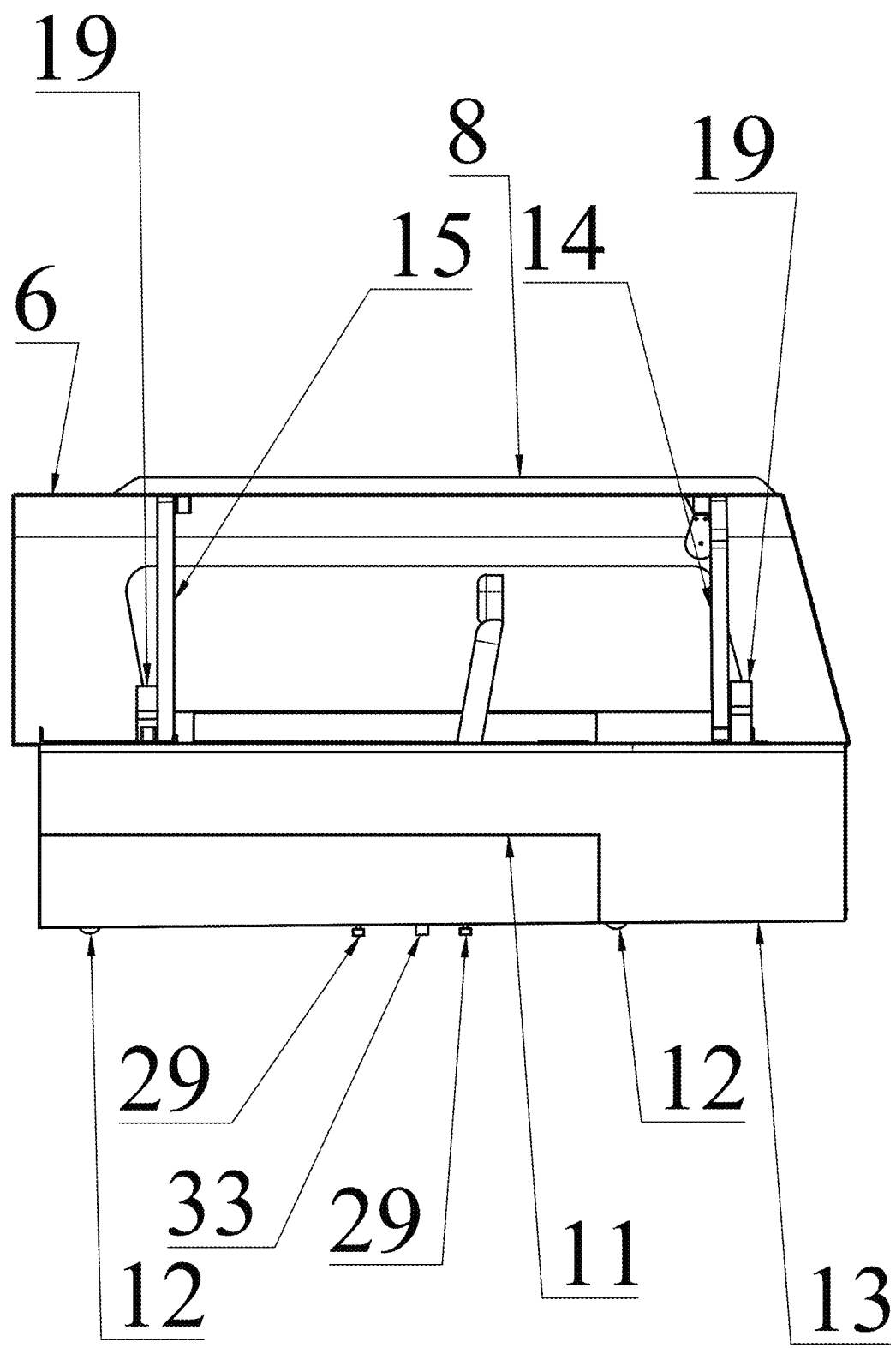
FIG. 32 illustrates a left side elevation view of the modular truck bed compartment without jack legs installed. The left half of the truck cap roof portion of the compartment is removed for visibility of the interior chassis structure and seat.
Figure 33:
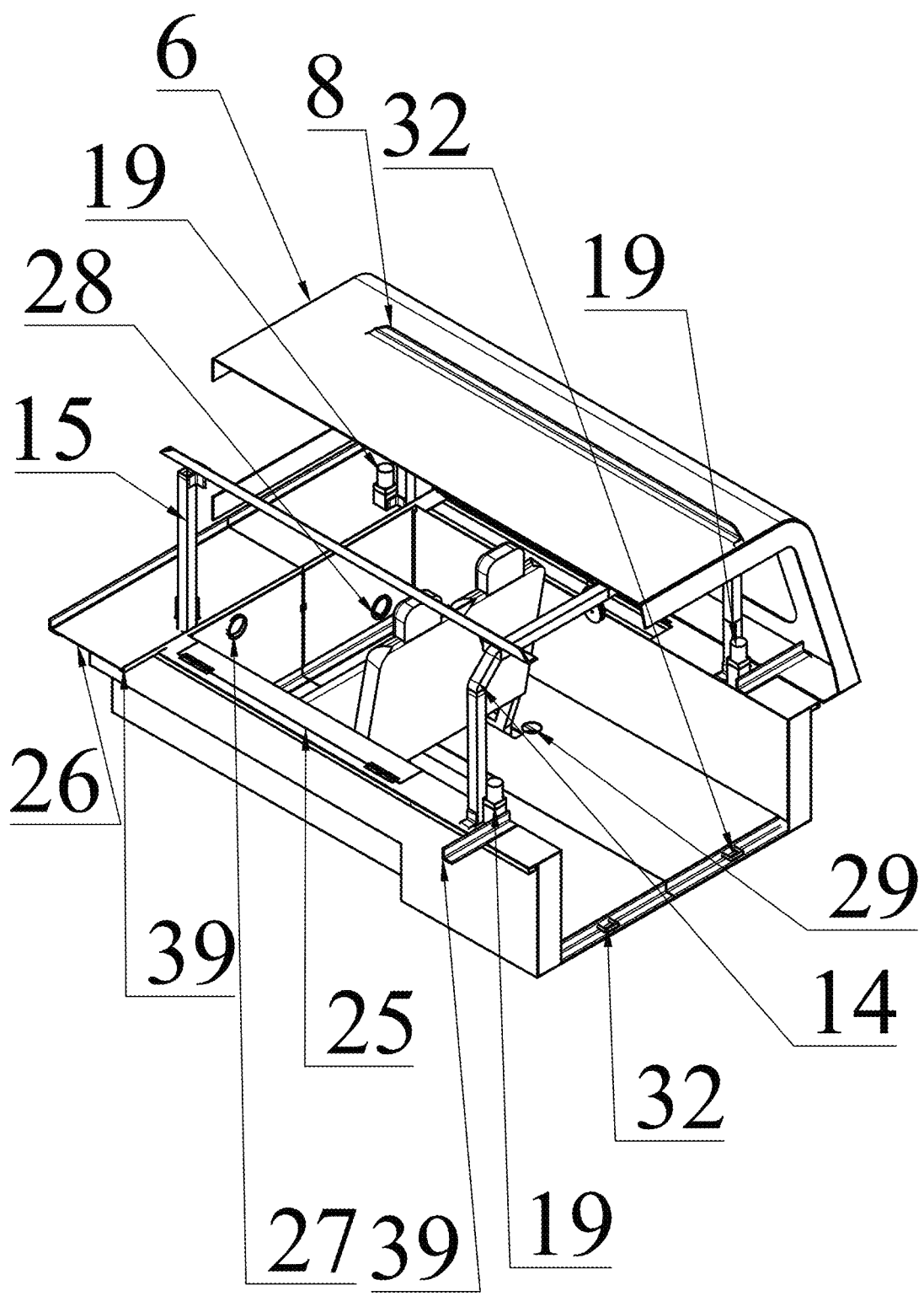
FIG. 33 illustrates a top left rear perspective view of the modular truck bed compartment without jack legs installed. The left half of the truck cap roof portion of the compartment is removed for visibility of the interior chassis structure and seat.
Figure 34:
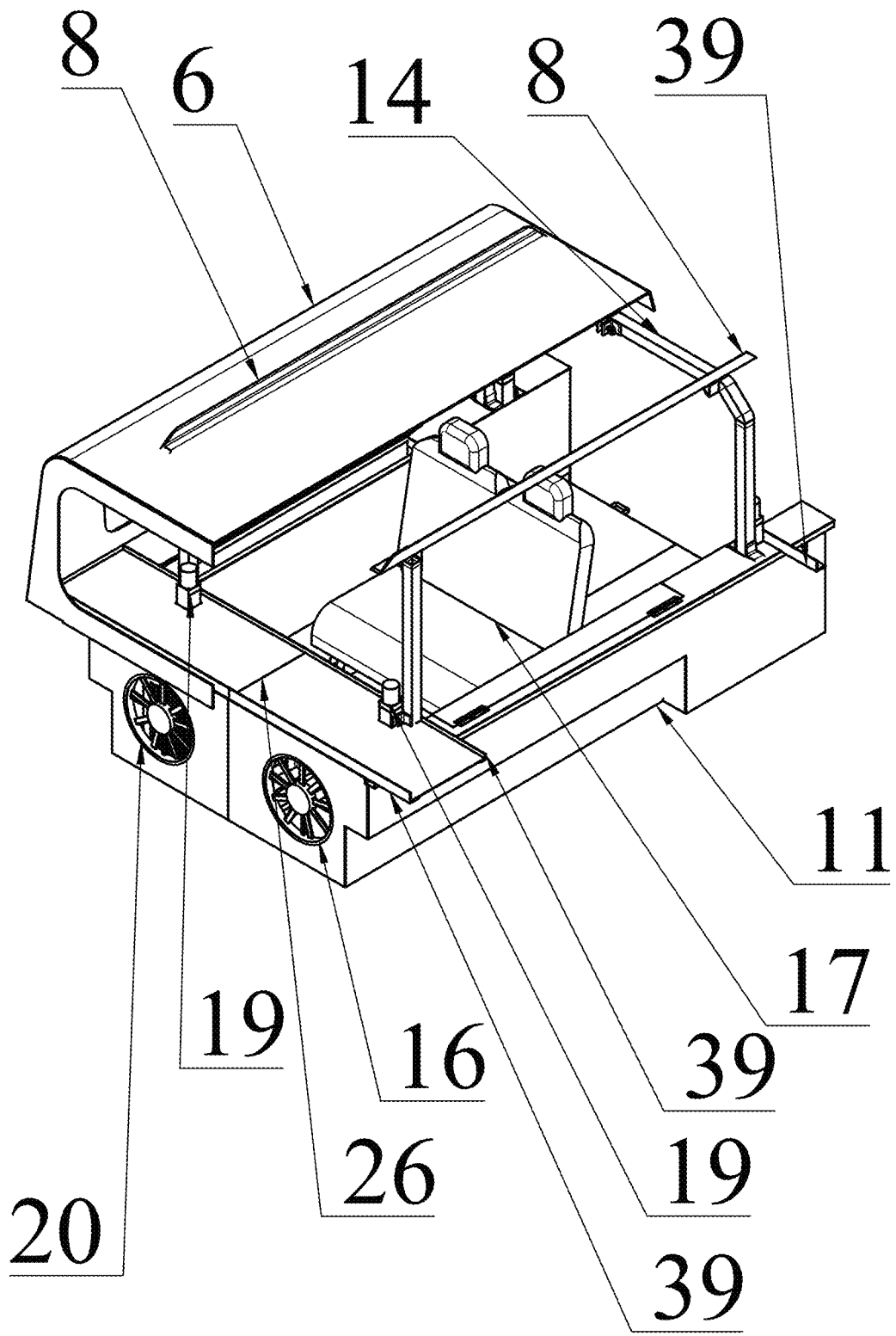
FIG. 34 illustrates a top left front perspective view of the modular truck bed compartment without jack legs installed. The left half of the truck cap roof portion of the compartment is removed for visibility of the interior chassis structure and seat.
Figure 35:
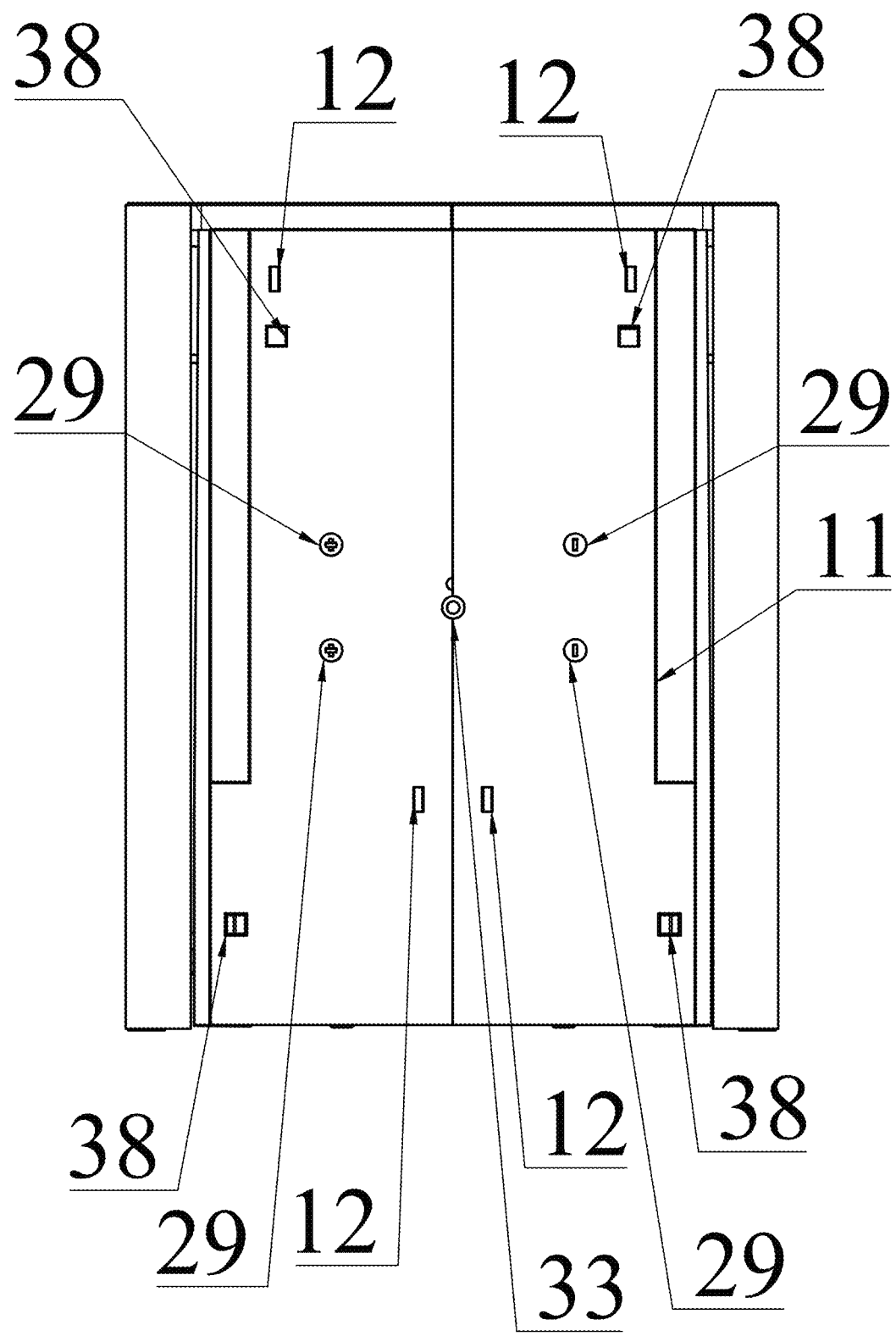
FIG. 35 illustrates a bottom view of the modular truck bed compartment without jack legs installed.
Figure 36:
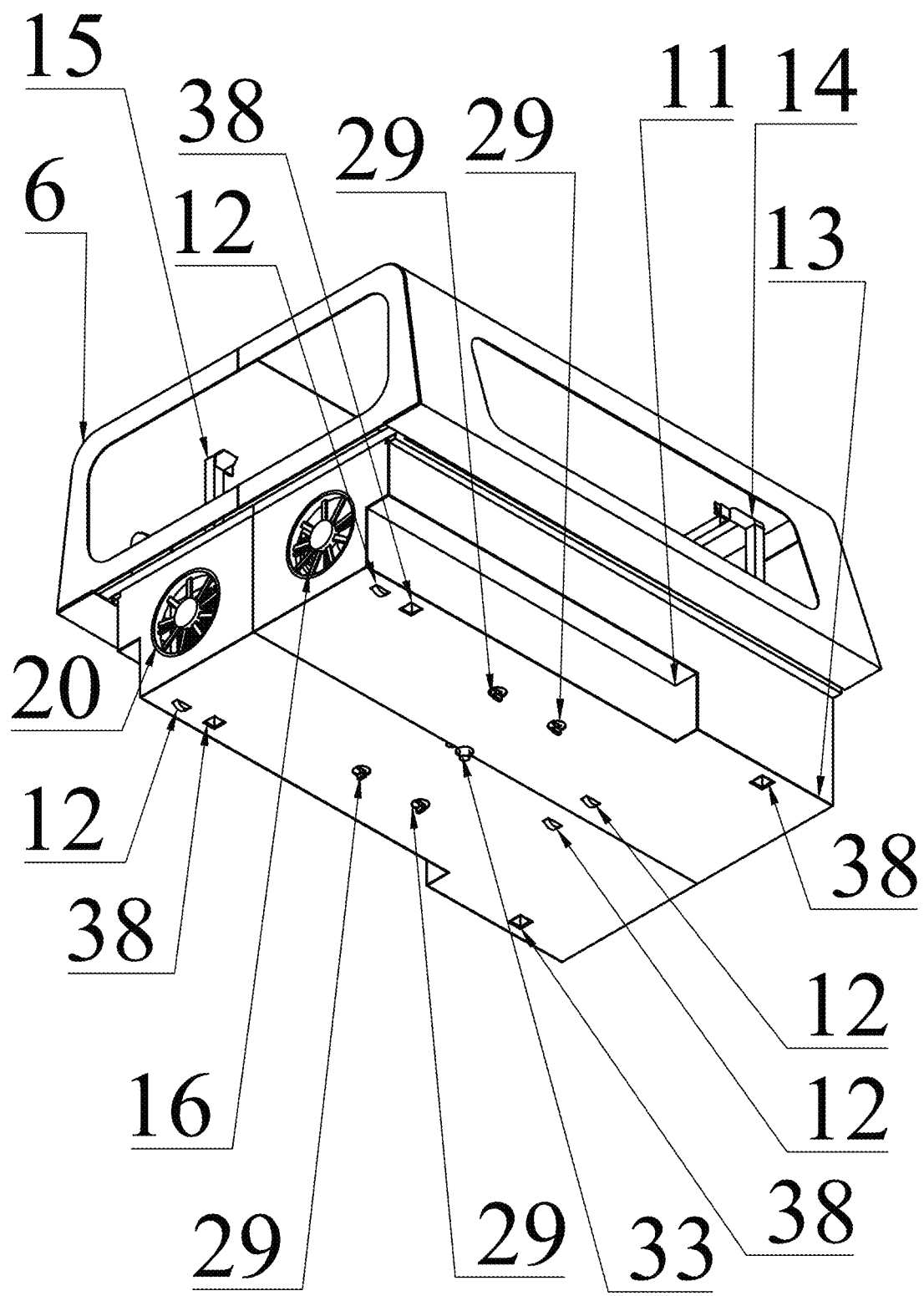
FIG. 36 illustrates a bottom front left perspective view of the modular truck bed compartment without jack legs installed.
Figure 37:
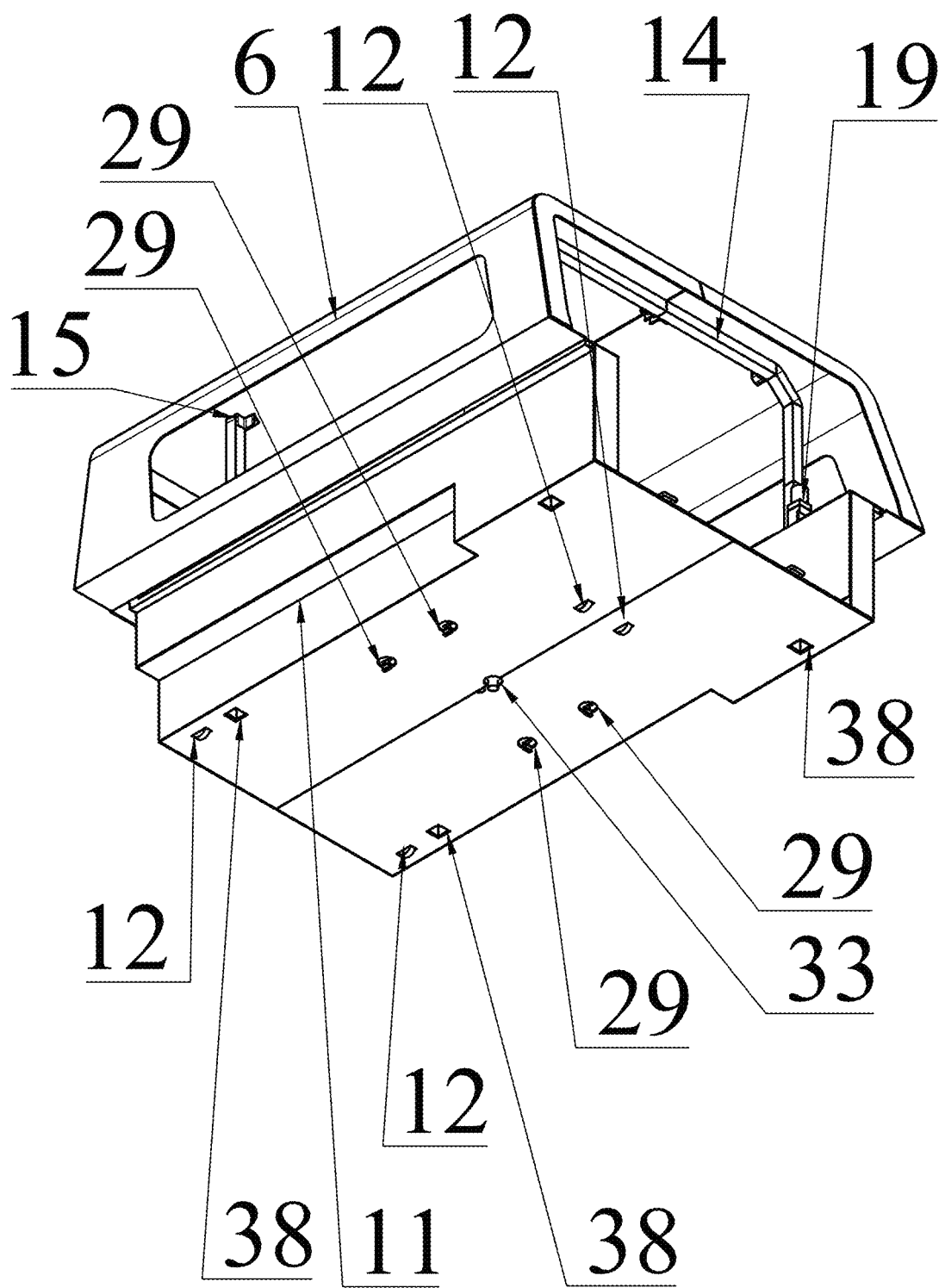
FIG. 37 illustrates a bottom rear left perspective view of the modular truck bed compartment without jack legs installed.
Figure 38:
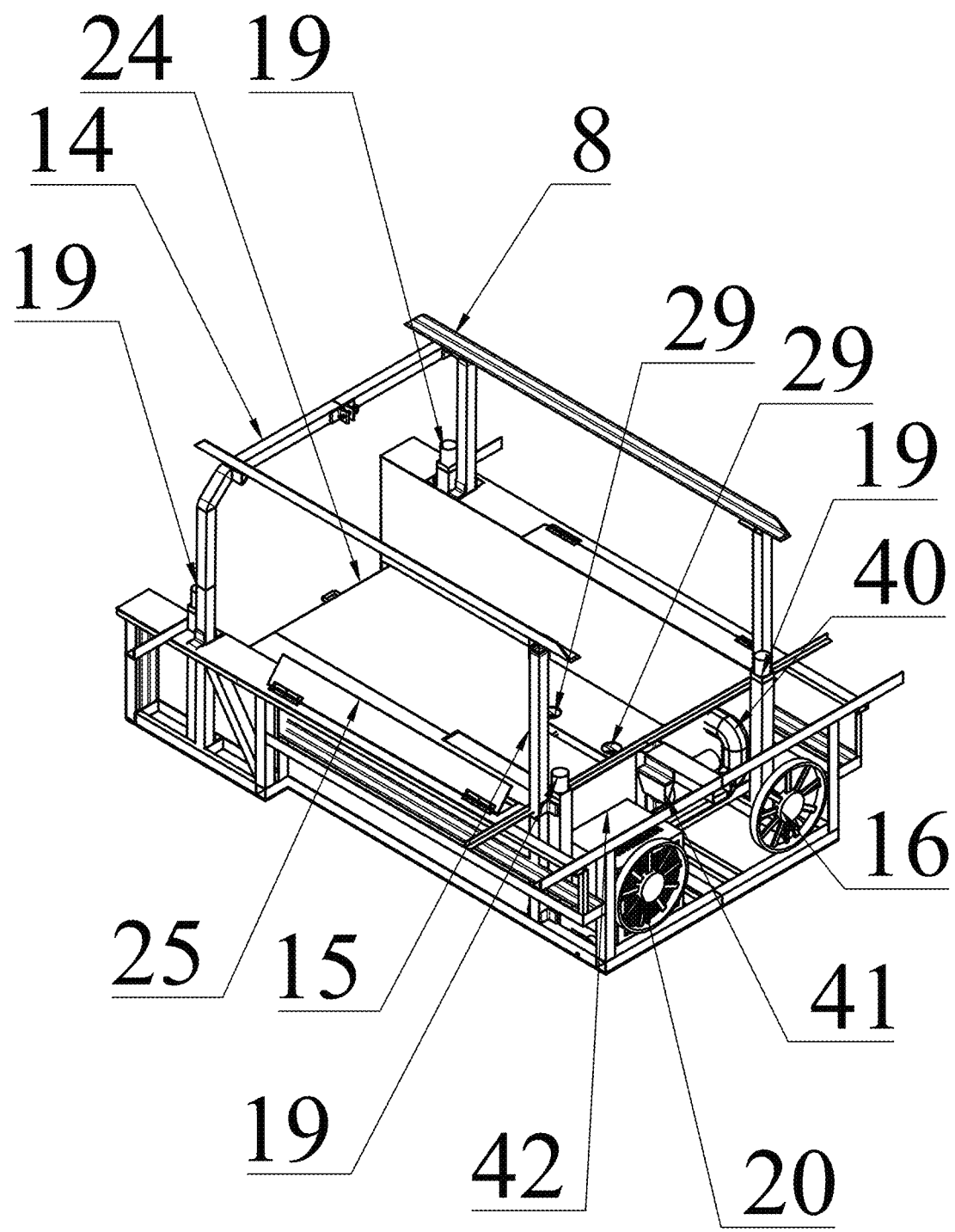
FIG. 38 illustrates a top front right perspective view of the modular chassis with truck topper roof assembly and sections of outer and inner tubs removed to reveal HVAC components installed within the plenum.
Figure 39:
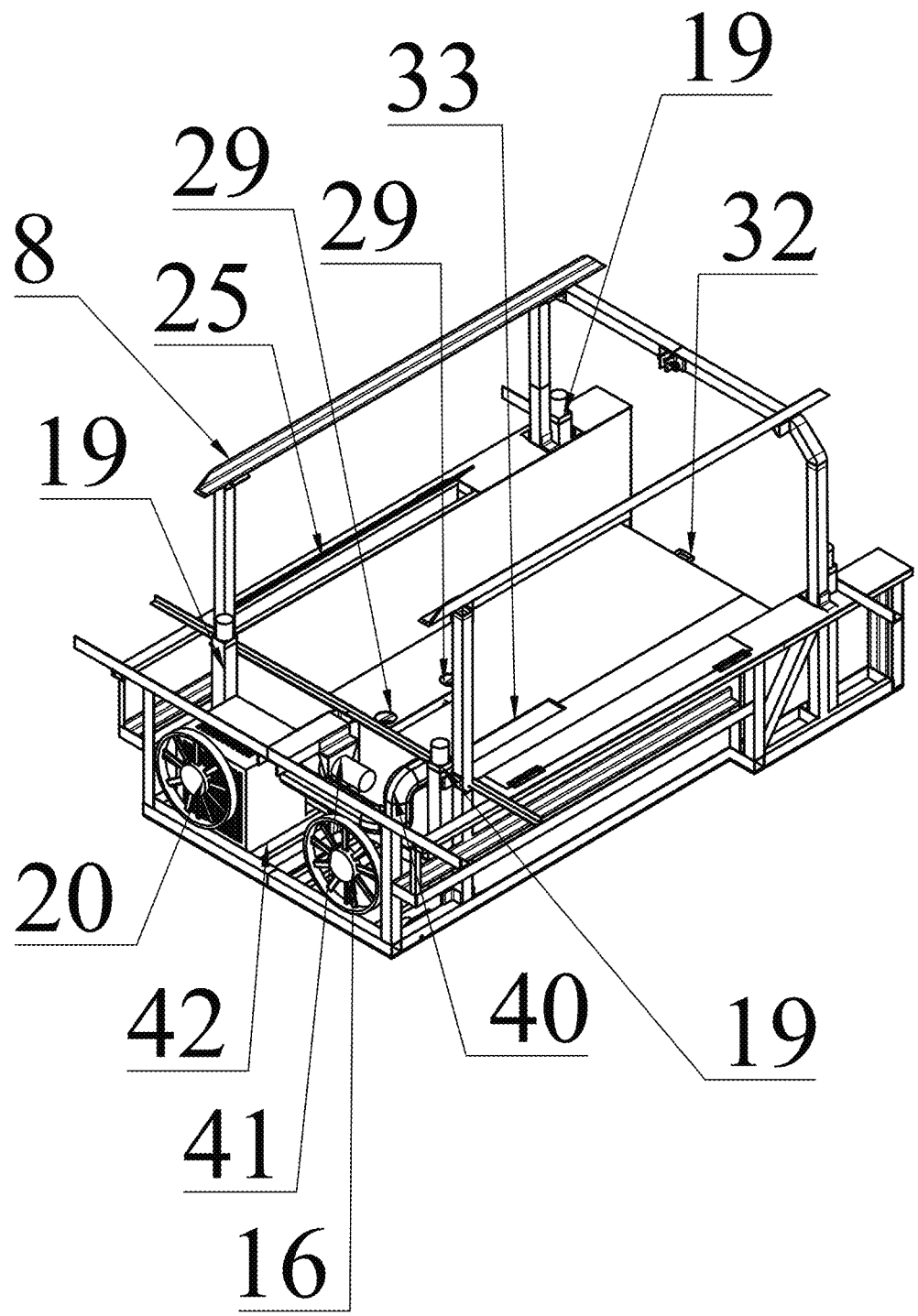
FIG. 39 illustrates a top front left perspective view of the modular compartment chassis with truck topper roof assembly and sections of outer and inner tubs removed to reveal HVAC components installed within the plenum.
Figure 40:
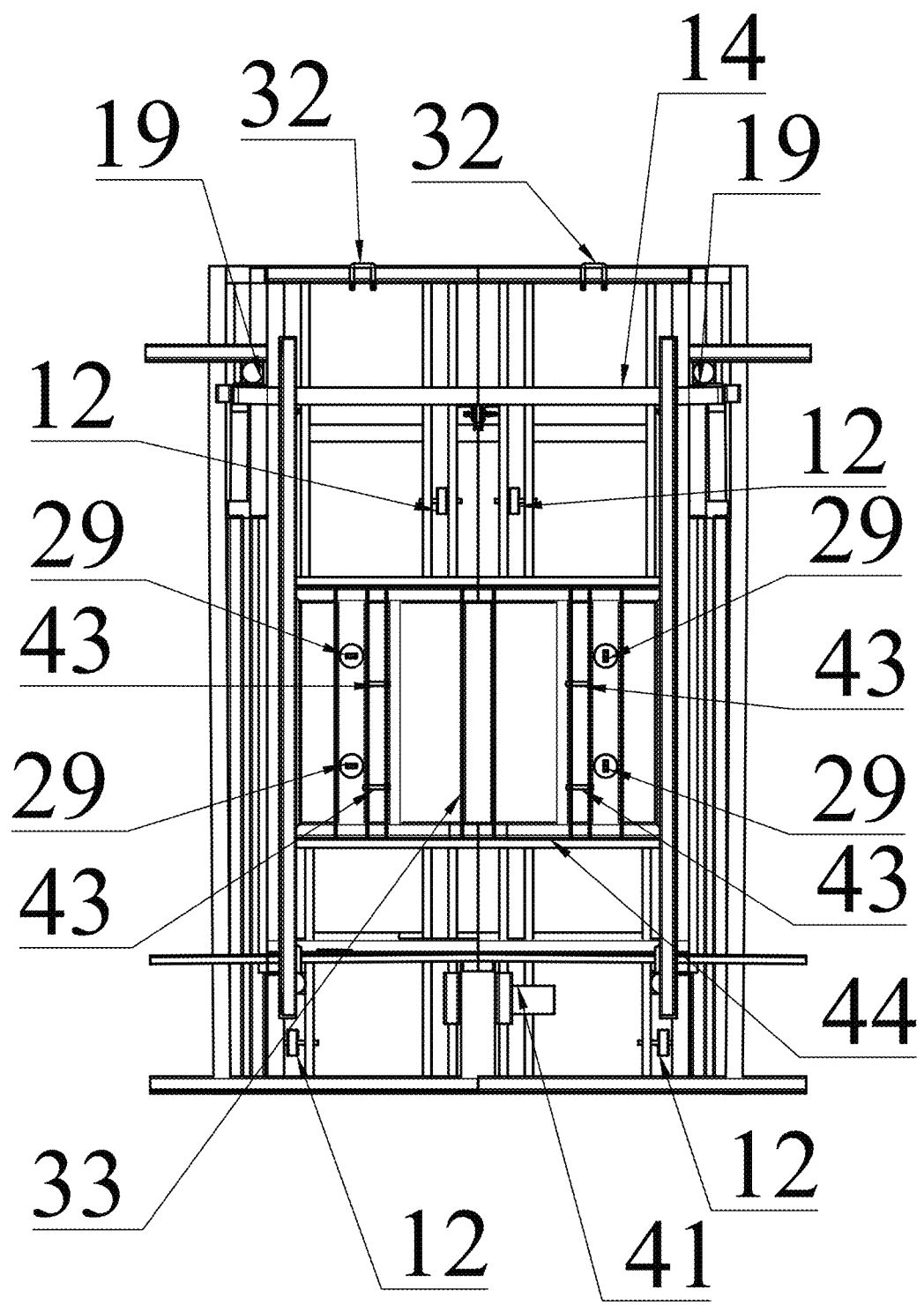
FIG. 40 illustrates a top view of the modular truck bed compartment chassis including the hitch frame adaptors, winch, roller wheels, and jack legs.
Figure 41:
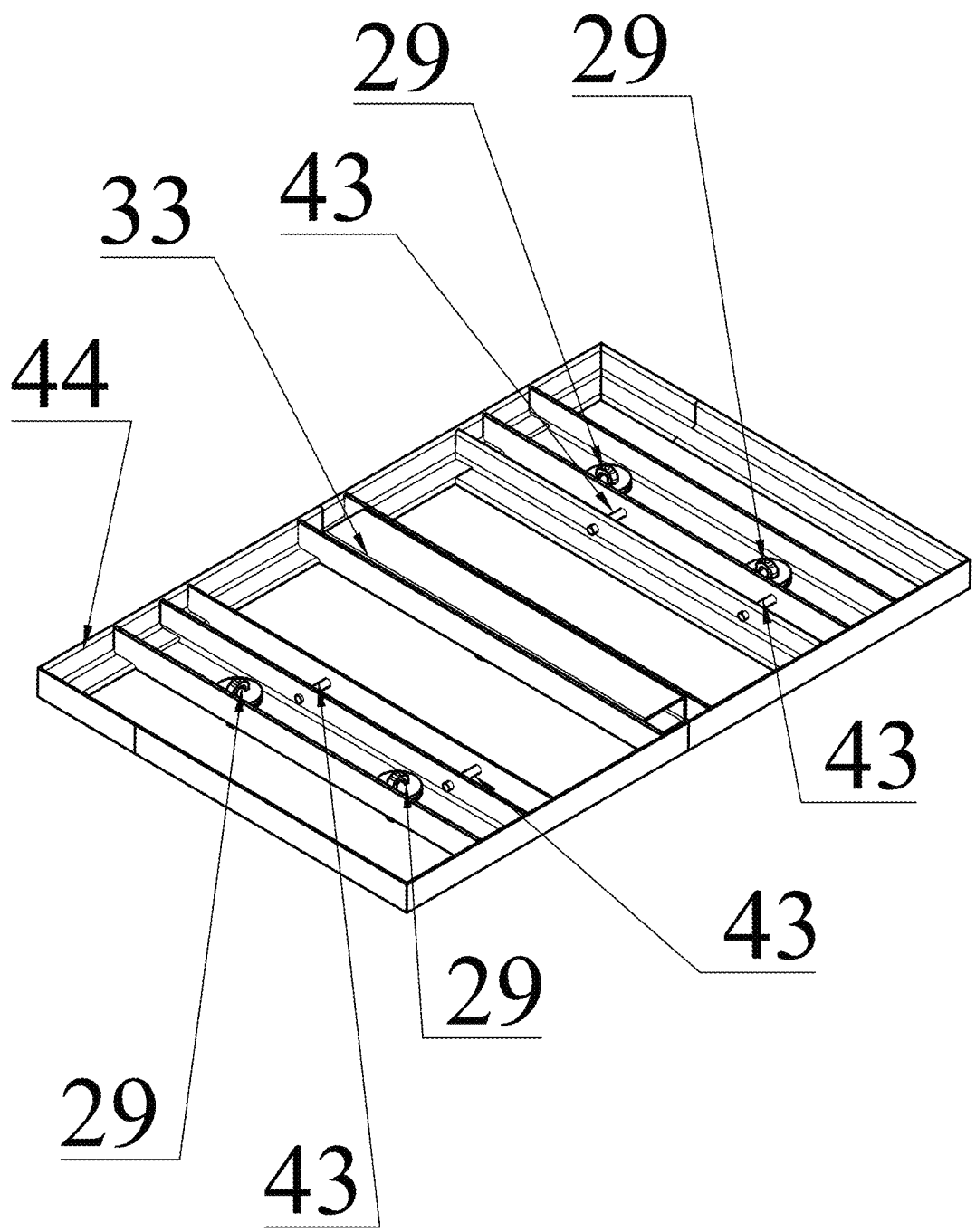
FIG. 41 illustrates a top right front perspective view of the hitch frame insert, gooseneck adaptor plate, and fifth wheel underbed attachment fittings (pucks) installed. Fifth wheel underbed attachment fittings are oriented at ninety-degree offsets between left and right sides to depict locked and unlocked condition.
Figure 42:
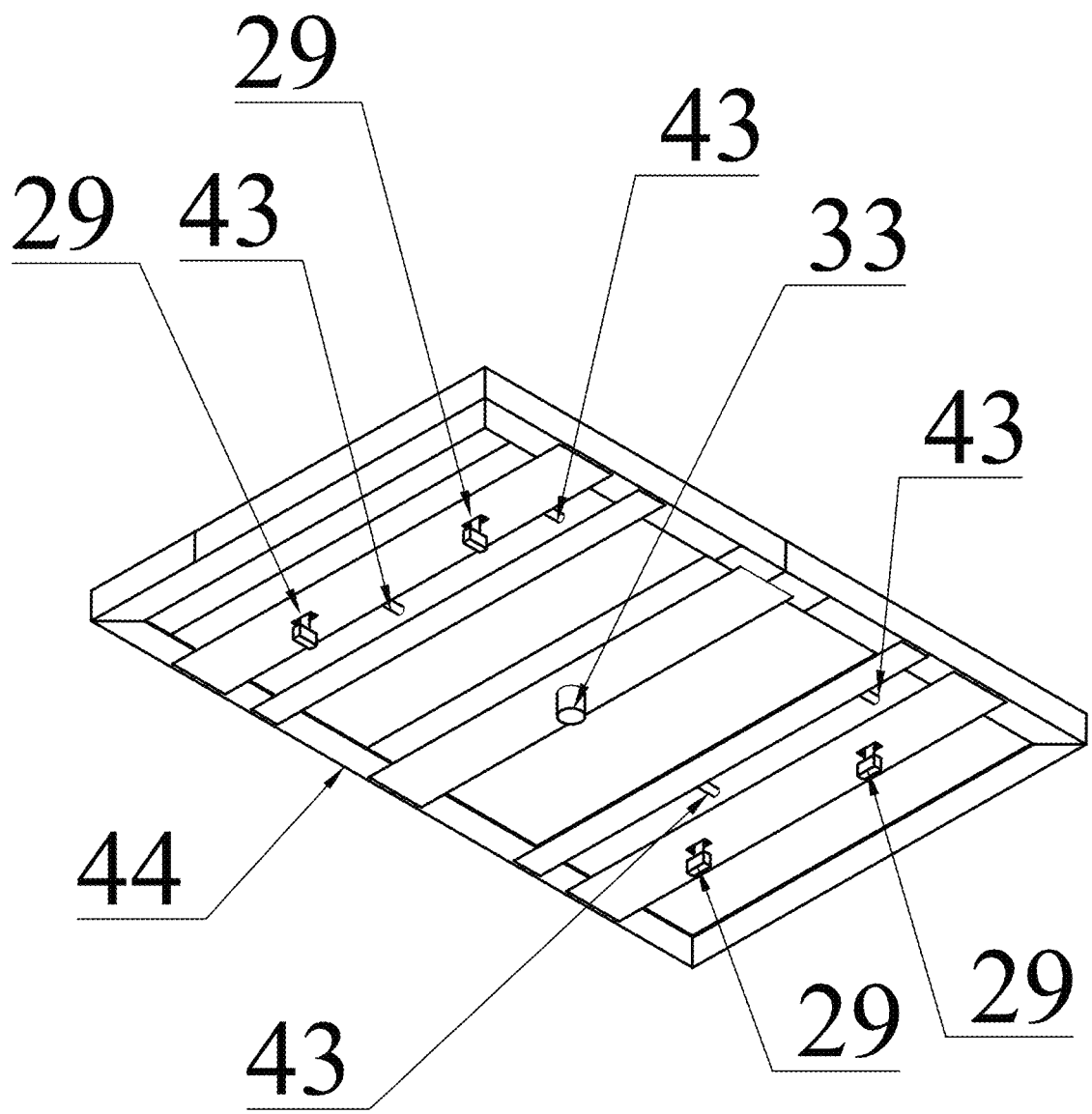
FIG. 42 illustrates a bottom right front perspective view of the hitch frame insert, gooseneck adaptor plate, and fifth wheel underbed attachment fittings (pucks) installed. Fifth wheel underbed attachment fittings are oriented at ninety-degree offsets between left and right sides to depict locked and unlocked condition.
Figure 43:
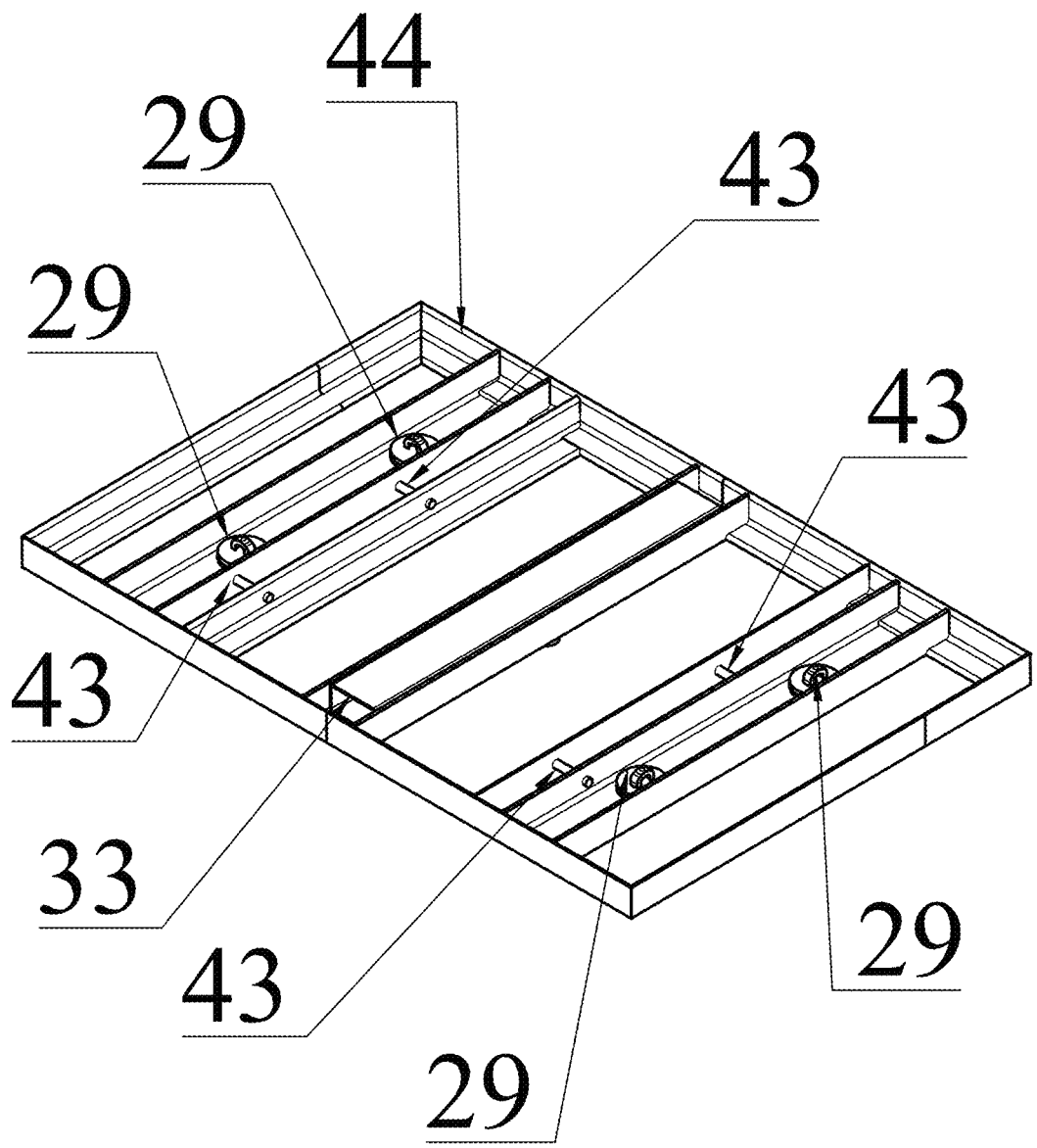
FIG. 43 illustrates a top left front perspective view of the hitch frame insert, bench seat mounting rails, gooseneck adaptor plate, and fifth wheel underbed attachment fittings (pucks) installed. Fifth wheel underbed attachment fittings are oriented at ninety-degree offsets between left and right sides to depict locked and unlocked condition.
Figure 44:
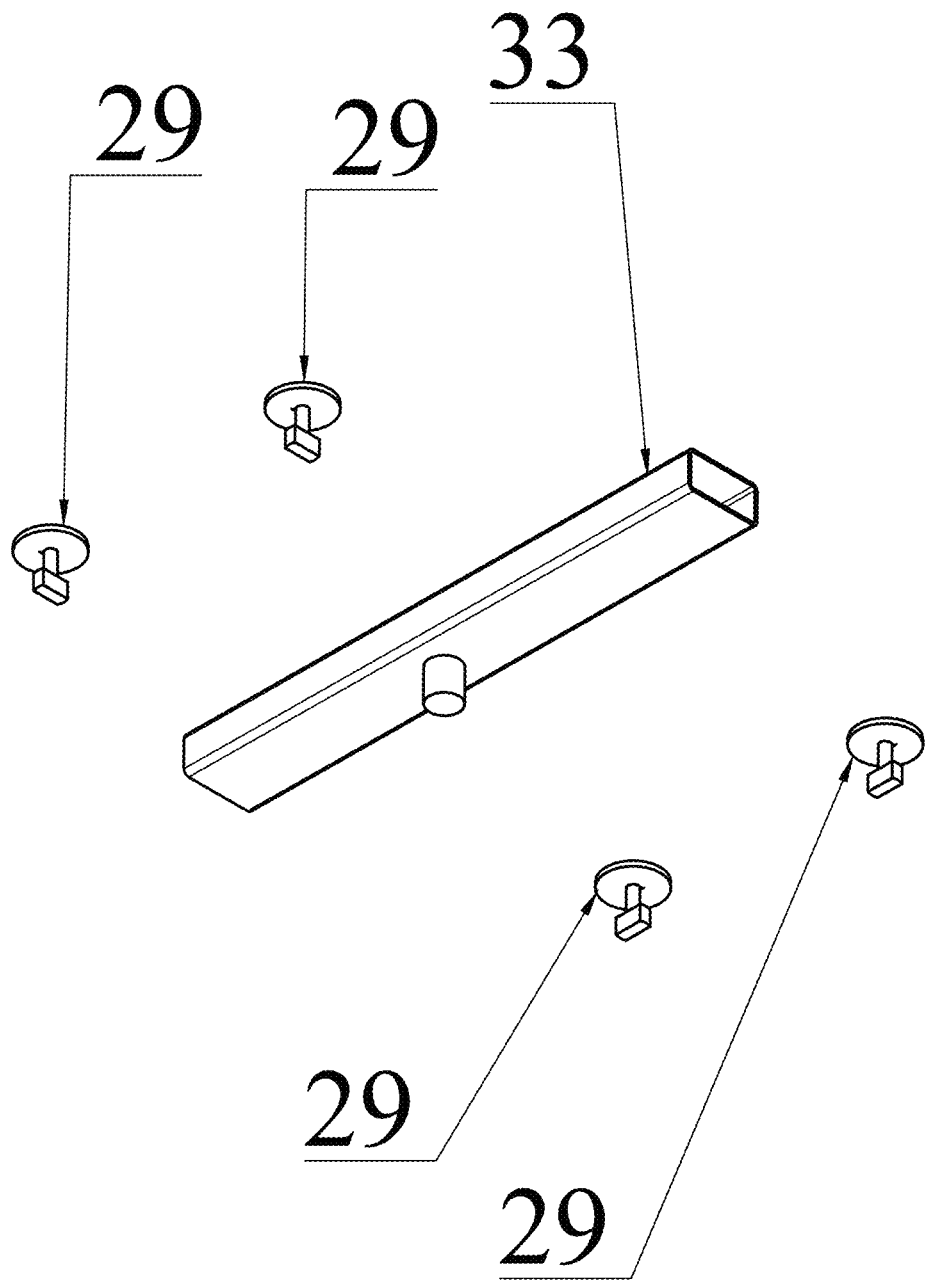
FIG. 44 illustrates a bottom left front perspective view of the gooseneck adaptor plate, and fifth wheel underbed attachment fittings (pucks). Fifth wheel underbed attachment fittings are oriented at ninety-degree offsets between left and right sides to depict locked and unlocked condition.
Figure 45:
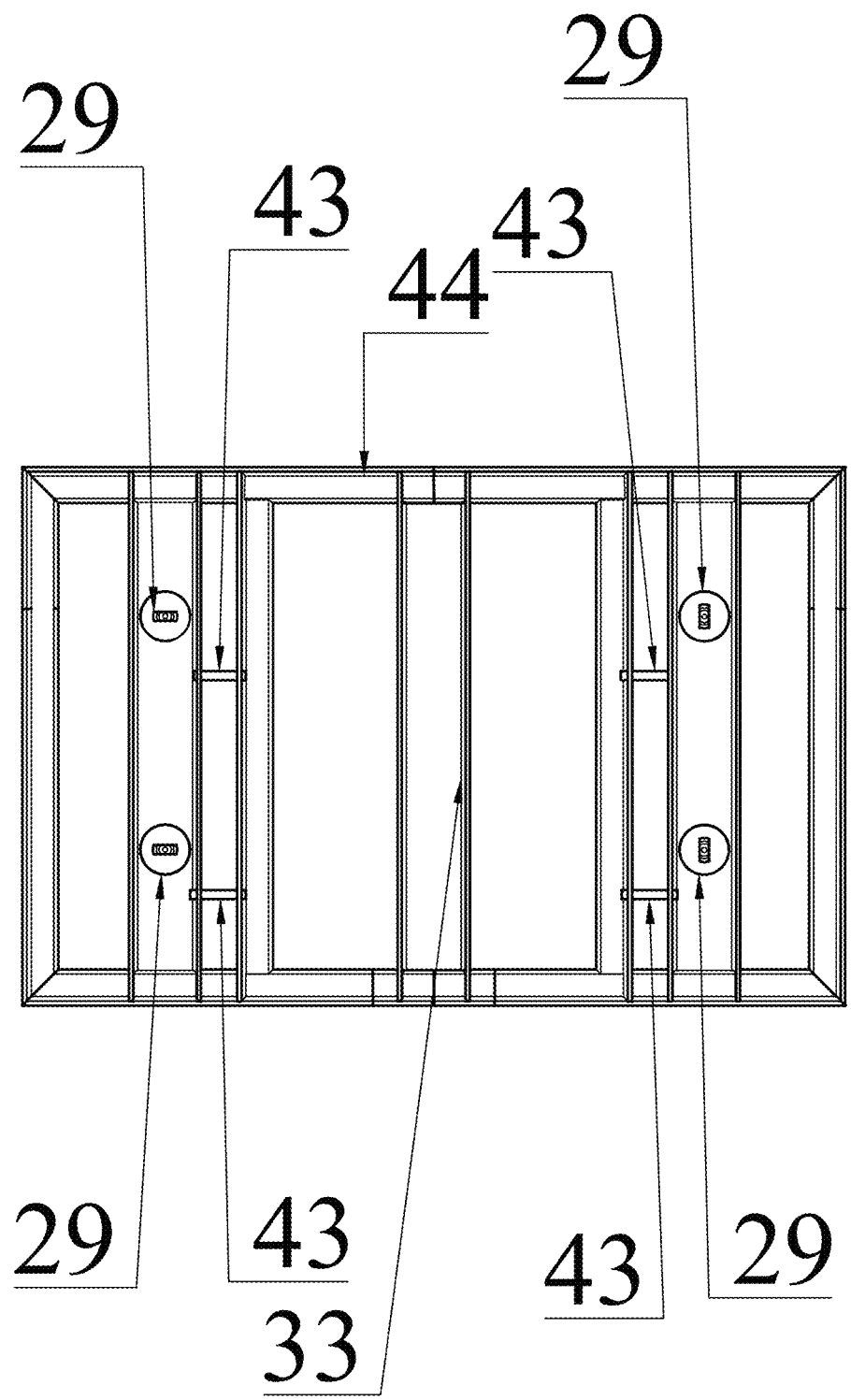
FIG. 45 illustrates a top view of the hitch frame insert, gooseneck adaptor plate, and fifth wheel underbed attachment fittings (pucks) installed. Fifth wheel underbed attachment fittings are oriented at ninety-degree offsets between left and right sides to depict locked and unlocked condition.
Figure 46:
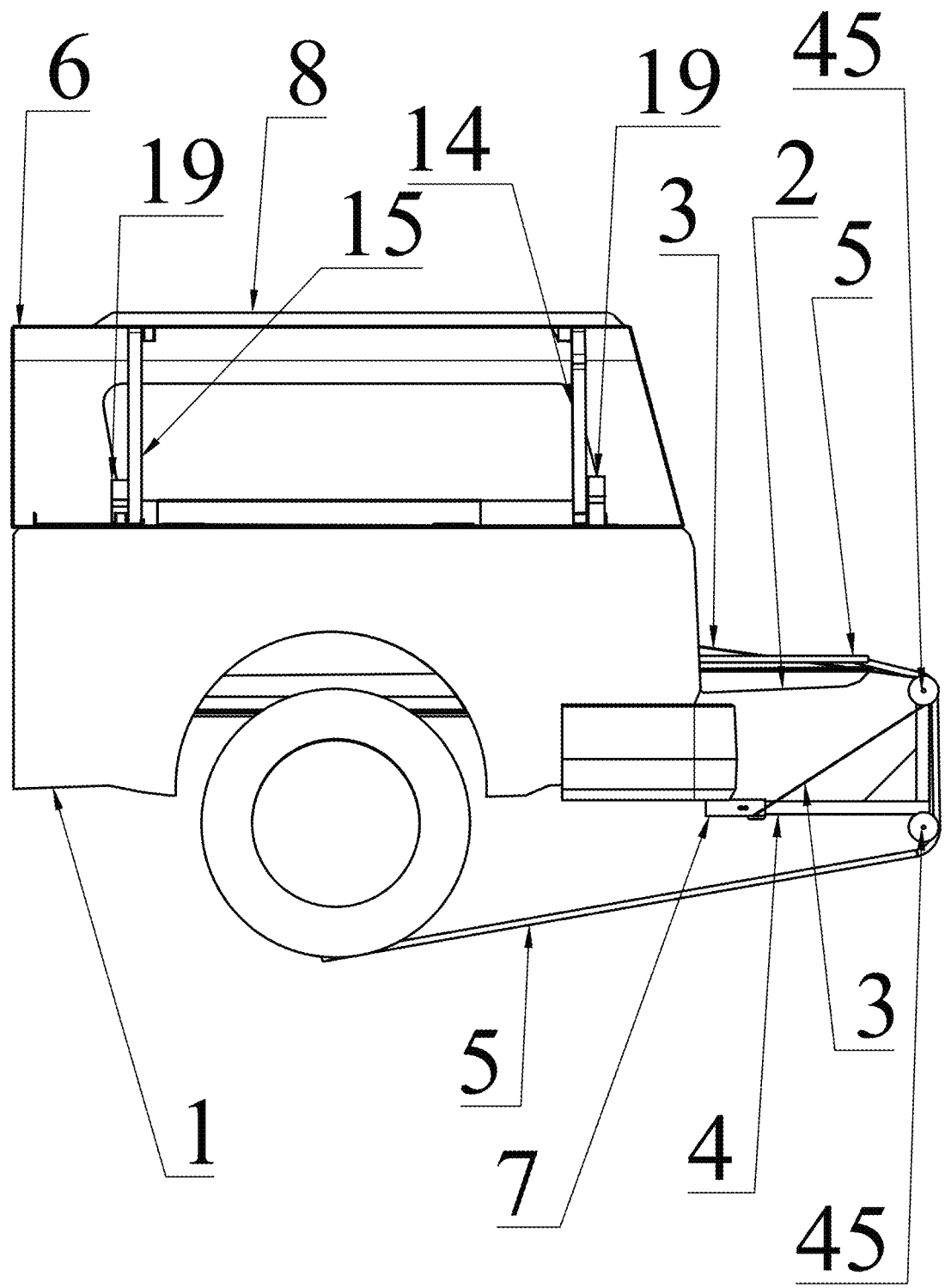
FIG. 46 illustrates a left side elevation view of a truck bed with installed modular truck bed compartment, tailgate situated in down position, two configurations of extraction cable, rope or straps, and extraction hitch roller attachment installed. The left half of the truck cap roof portion of the compartment is removed for visibility of the interior chassis structure. The seat is removed for clarity.
Figure 47:
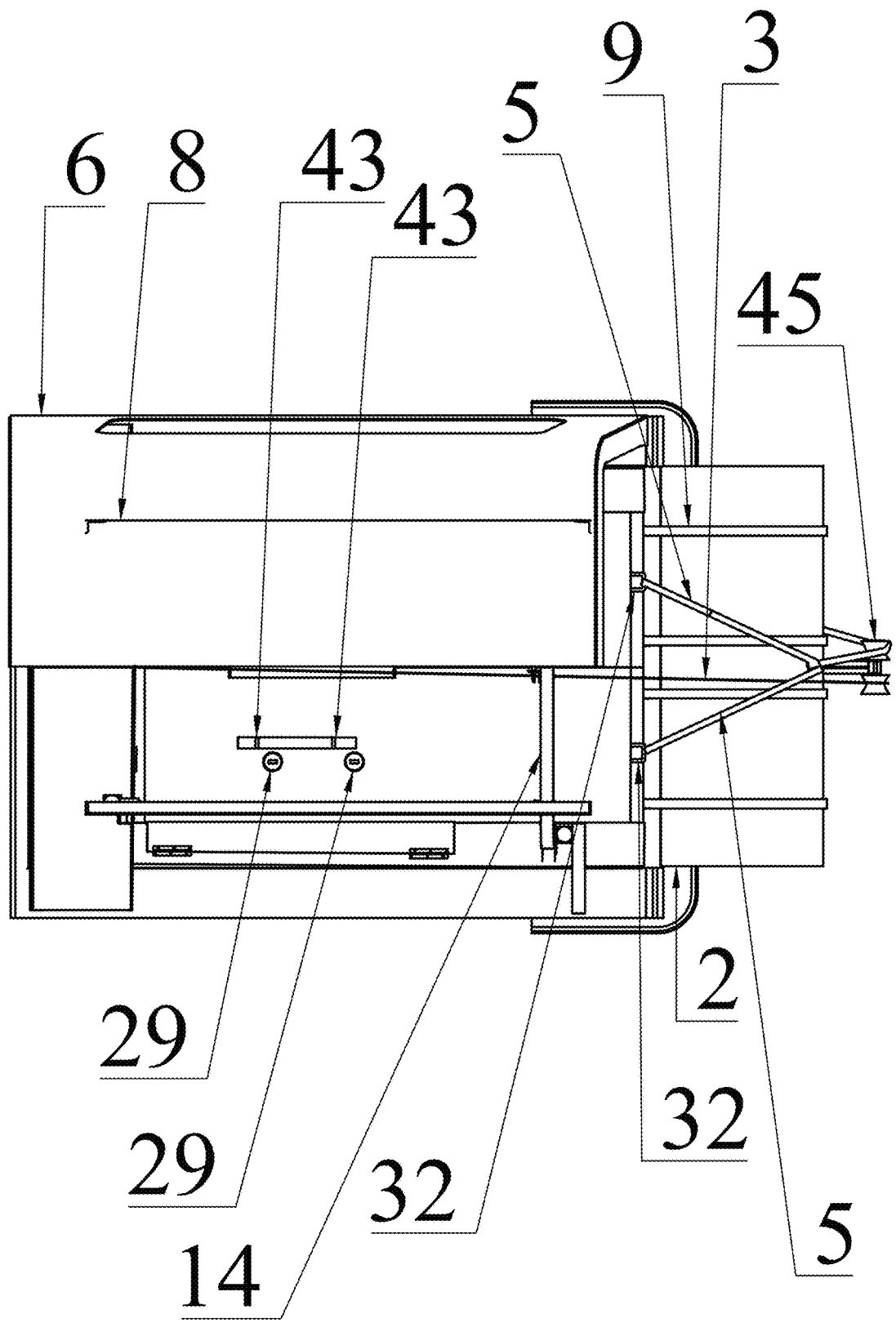
FIG. 47 illustrates a top view of a truck bed with installed modular truck bed compartment, tailgate situated in down position, two configurations of extraction cable, rope or straps, and extraction hitch roller attachment installed. The left half of the truck cap roof portion of the compartment is removed for visibility of the interior chassis structure. The seat is removed for clarity.
Figure 48:
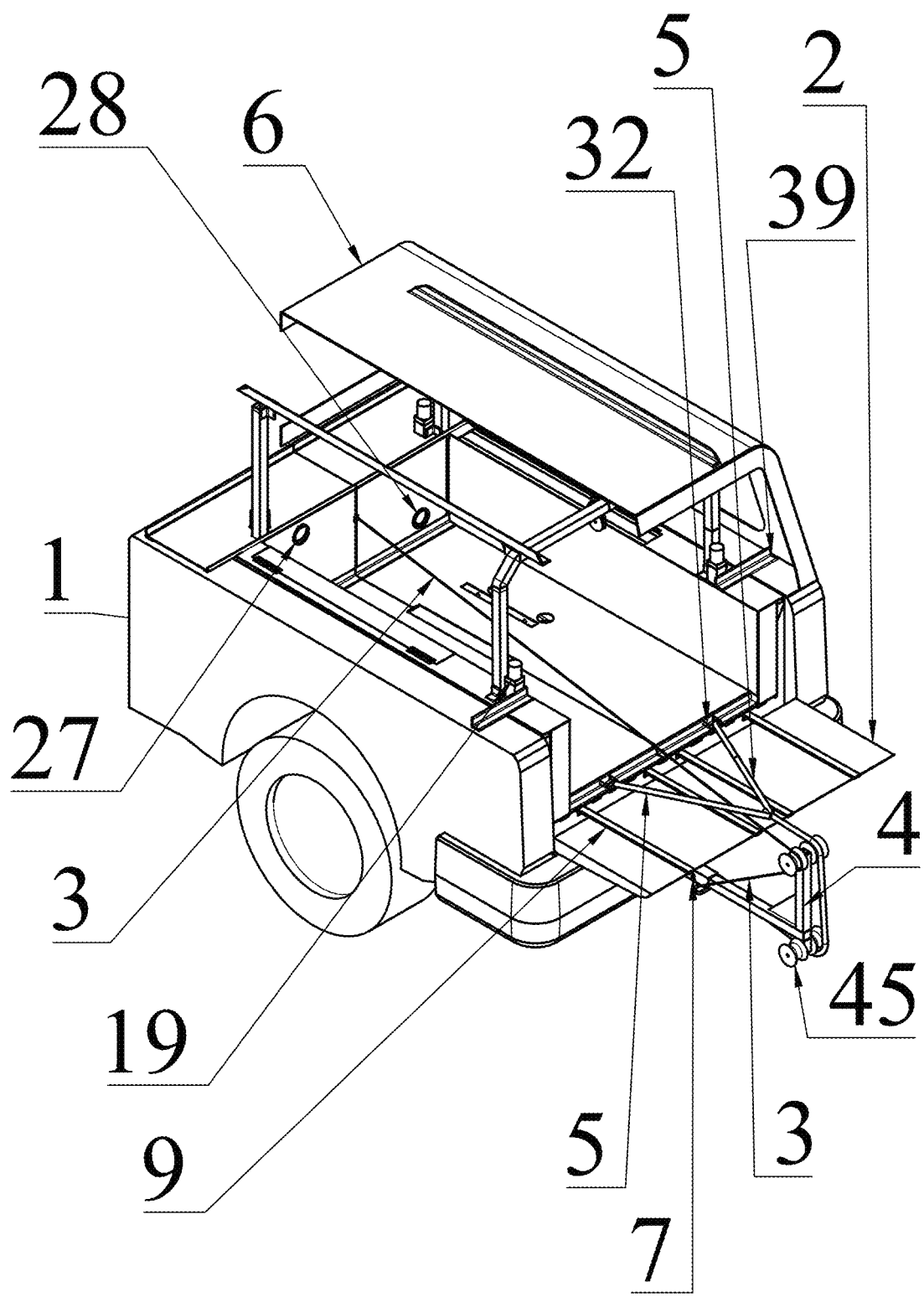
FIG. 48 illustrates a top left rear view of a truck bed with installed modular truck bed compartment, tailgate situated in down position, two configurations of extraction cable, rope or straps, and extraction hitch roller attachment installed. The left half of the truck cap roof portion of the compartment is removed for visibility of the interior chassis structure. The seat is removed for clarity.
Figure 49:
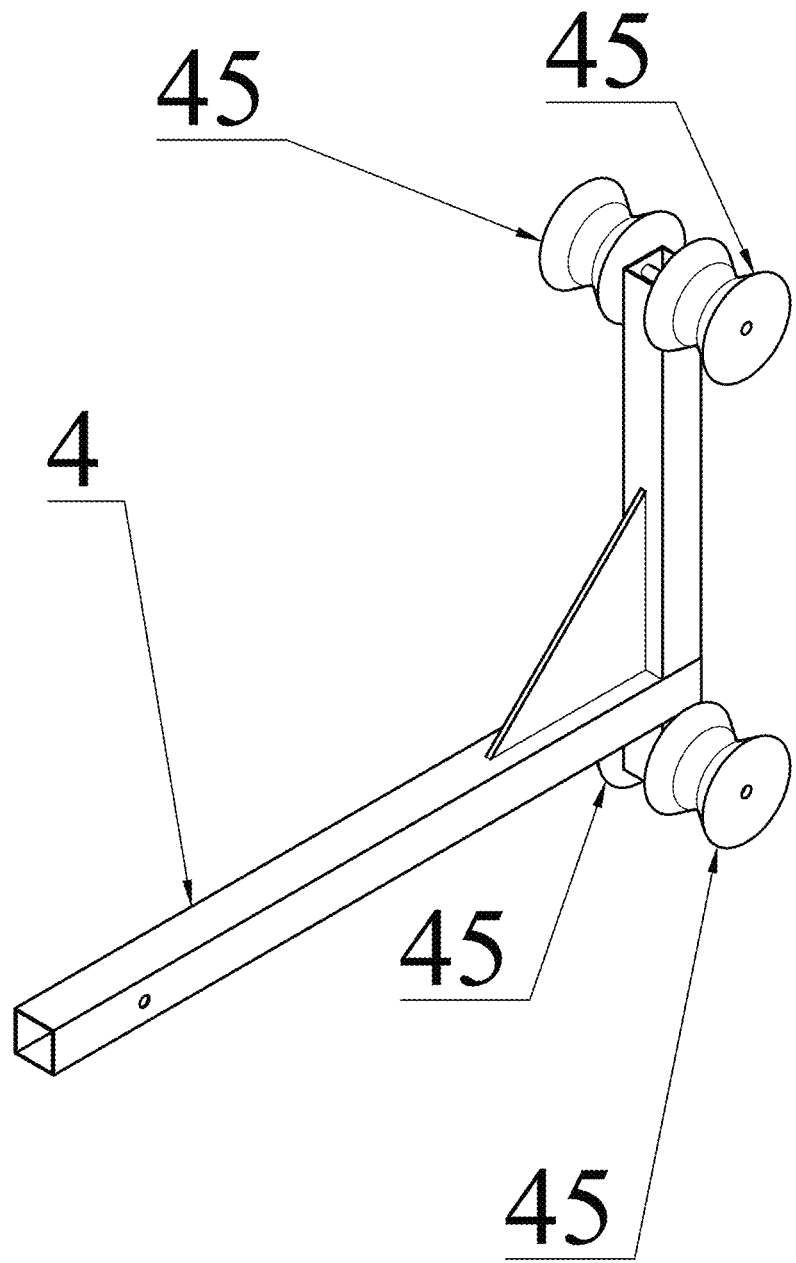
FIG. 49 illustrates a top left front view of the extraction hitch roller attachment.
Figure 50:
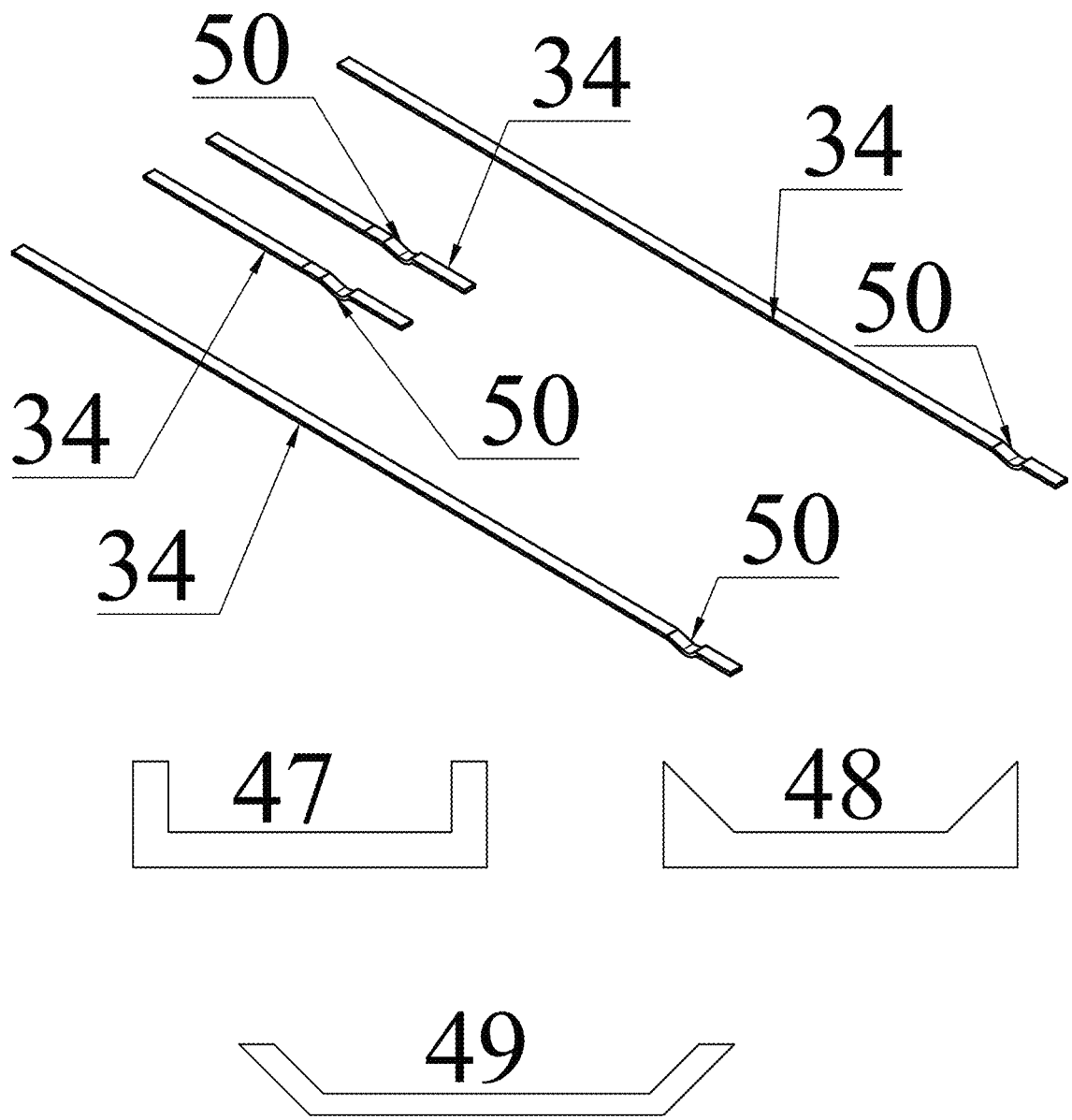
FIG. 50 illustrates a top right front view of the truck bed roller skids and inclined pockets with cross three roller skid cross section shapes.
Figure 51:
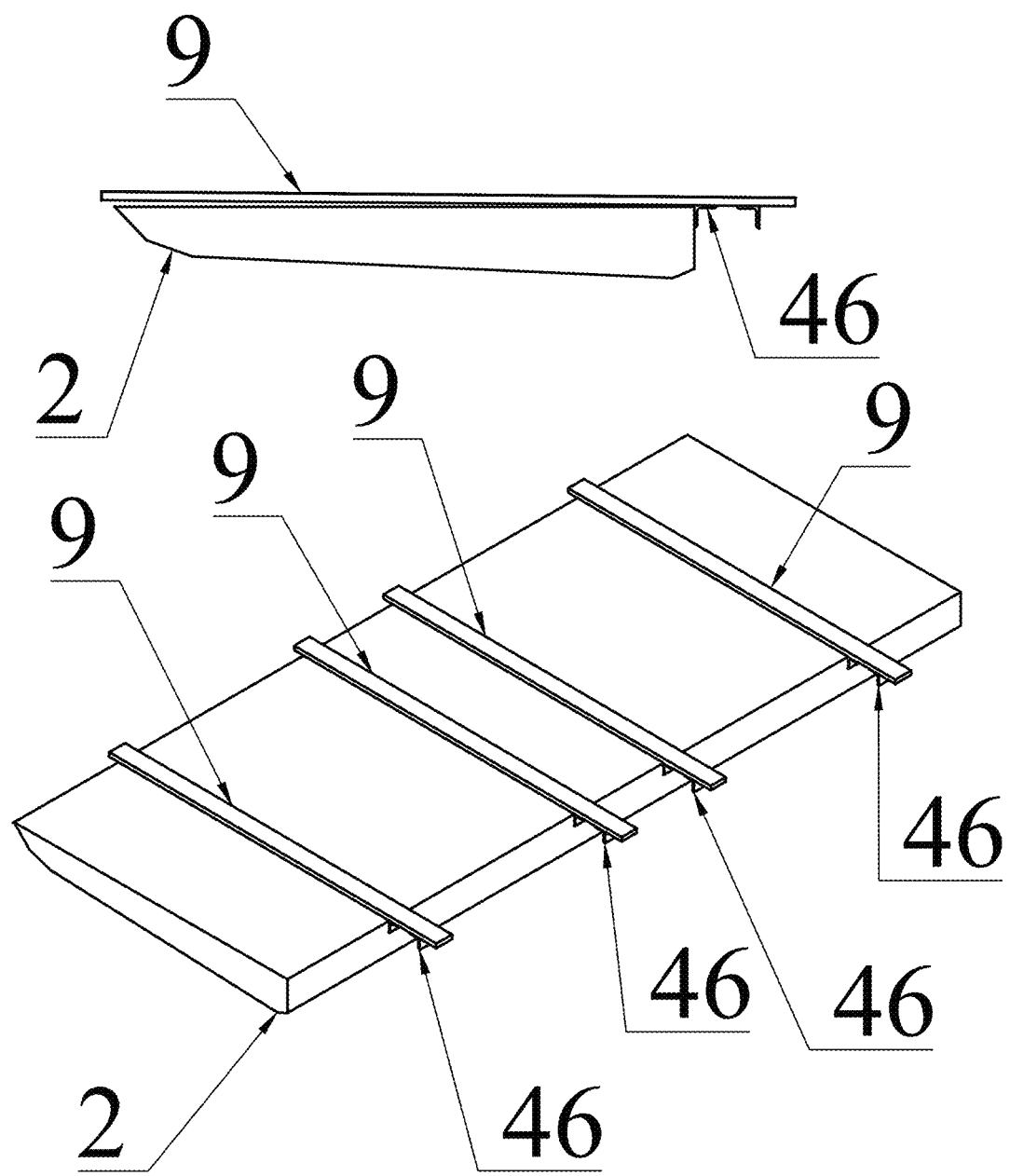
FIG. 51 illustrates a right side elevation view and top right front view of the truck tailgate with tailgate roller skids installed.
Figure 52:
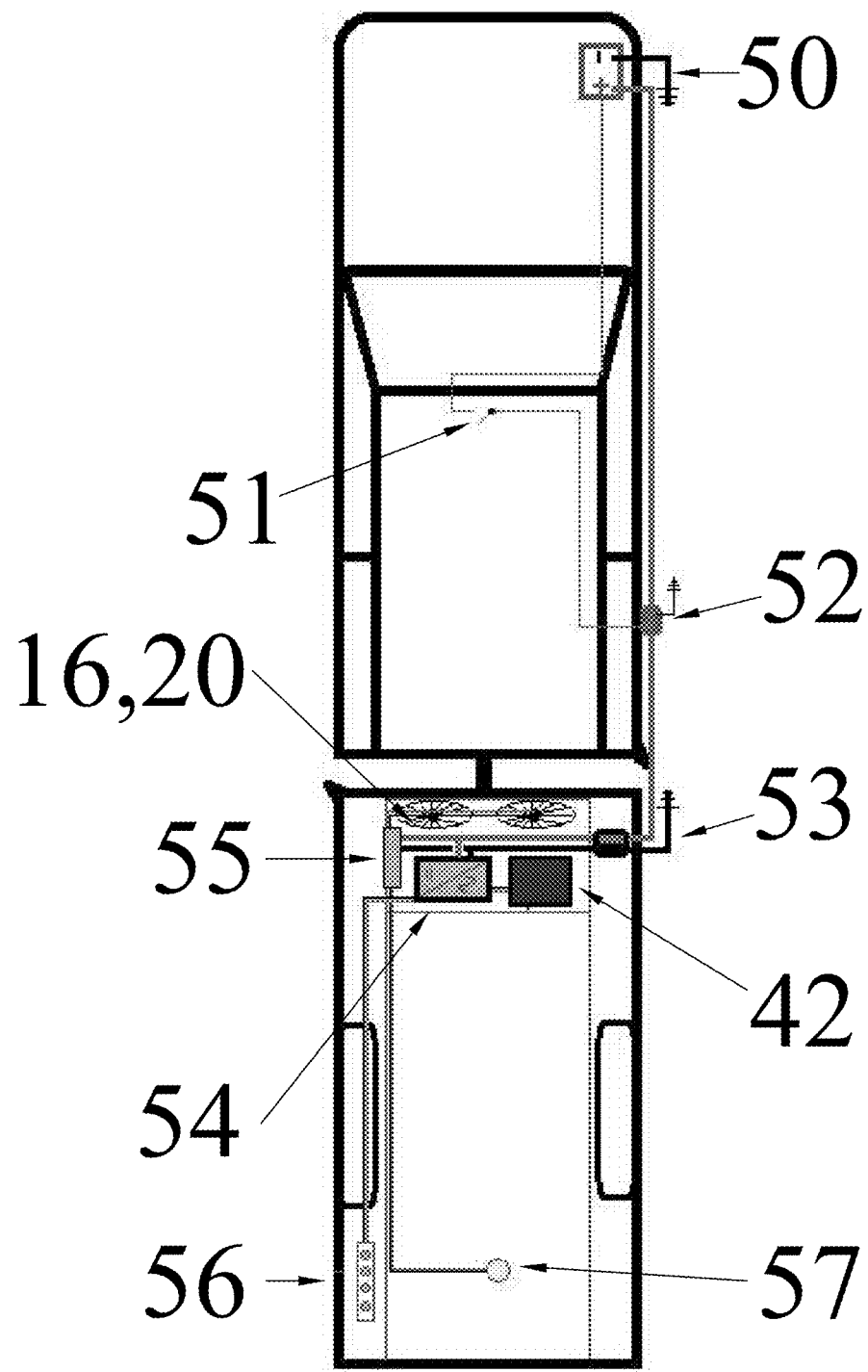
FIG. 52 illustrates a top view of the electrical integration schematic for the Direct Current (DC) and Alternating Current (AC) power supply system for the truck bed compartment.

By way of example, and referring to FIGS. 1-48, one embodiment of an automobile assembly is configured to convert a truck bed into a passenger compartment. The automotive assembly comprises a truck 1 having a truck bed 2 and a tail gate. The truck 1 is attached to an extraction hitch roller attachment 4 which uses a winch cable 3 and an extraction strap 5. The winch cable 3 can be wrapped around a plurality of extraction hitch attachment rollers 45. A receiver hitch 7 is arranged beneath a bumper on the truck 1. The tail gate further comprises a tail gate roller track 9, and a tailgate roller skid securing and alignment bracket 46. The front wall of the truck bed further comprises an HVAC plenum ventilation fan, truck bed cutout 30 and an HVAC plenum ventilation fan truck bed cutout-intake 31. The truck bed 2 further comprises a plurality of truck bed roller tracks 34, the underbed gooseneck hitch attachment point 35, the underbed fifth wheel hitch attachment point 36, and truck bed wheel well 37.

Turning to the truck bed roller track 34 in more detail, the truck bed roller track 34 further comprises a truck bed roller track channel 50. The truck bed roller track channel 50 can have a square cross section 47, a beveled cross section 48, or a stamped sheet or plate cross section 49.

An upper compartment assembly 6 further comprises an upper side which is attached to roof cargo attachment rails 8. The upper compartment assembly 6 further comprises at least one member of an upper compartment set consisting of a truck cap, a truck topper, or a camper top.

The upper compartment assembly 6 is attached to a rear roll bar roof support structure 14 attached to a front roll bar roof support structure 15 with the roof cargo attachment rails 8 and a chassis frame 21. The front roll bar roof support structure 15 is joined to an upper jack assembly 19. The chassis frame 21 is attached to an outer tub 22 having a plurality of plenum fan cutouts 23. The plurality of plenum fan cutouts 23 include an HVAC plenum ventilation fan intake 16 and an HVAC plenum ventilation fan exhaust 20. The chassis frame 21 is further attached to a plurality of chassis frame attachment points 39. The chassis frame 21 is attached to a plurality of underbed fifth wheel hitch attachment fittings 29, the extraction U-bolt connector 32, underbed gooseneck hitch adaptor fitting 33, a plurality of removable bench seat attachment points 43, and an underbed hitch chassis insert assembly 44. The chassis frame 21 is further attached to an electric winch 41.

The lower compartment assembly 13 comprises an outer tub 22, a chassis frame 21 and an inner tub 24. The lower compartment assembly 13 is attached to a plurality of drop leg extensions 10. The lower compartment assembly 13 further comprises a pair of outer edge wheel well pockets 11 which are configured to accommodate a wheel well extending into the truck bed 2.

The inner tub 24 further comprises a plurality of inner tub storage compartments 25 and a plurality of plenum access lids 26. The inner tub 24 further comprises a plurality of HVAC conditioned air vents 27 and a plurality of HVAC return air vents 28. The outer tub 22 further comprises a plurality of outer tub jack leg holes 38 which are configured to accommodate at least one drop leg extension 10. The HVAC conditioned air vent 27 is connected to an HVAC unit with a HVAC conditioned air duct 40.

The chassis frame 21 is attached to the underbed hitch chassis insert assembly 44. The underbed hitch chassis insert assembly 44 further comprises a plurality of removable bench seat attachment points 43 and the Underbed Fifth wheel hitch attachment fittings 29. The chassis frame 21 is attached to an electric heater and air conditioner 42.

Turning to the electrical arrangement, the vehicle 12V power supply 50 is electrically coupled to a 12V relay 52 with a 12V relay switch 51. The 12V relay 52 is electrically coupled to an electrical quick connect 53, and to 12V interior lighting 57. The electrical quick connect 53 is electrically coupled to a 12V to 115 VAC inverter 54. The 12V to 115 VAC inverter 54 is electrically coupled to a 12V bus and fuse panel 55, and a 115 VAC multi-outlet power strip 56.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, 16. In particular, any use of "step of" in the claims is not intended to invoke the provision of 35 U.S.C. § 112, 16.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. An automobile accessory, configured to convert a truck bed into at least one member of a compartment set consisting of: an enclosed cargo compartment, a passenger compartment, and a camping compartment; the automobile accessory comprising:
   a truck cabin, joined to a truck bed and further comprising a truck cabin rear bulkhead;
   at least two pockets arranged proximate a plurality of skids on the truck bed;
   a chassis, joined to a cargo, passenger, or camping compartment having a compartment forward bulkhead; wherein the chassis is detachably secured to the truck bed and further comprising at least two rollers;
   a gasket joined to the passenger compartment forward bulkhead creating a seal between the truck cabin and the passenger compartment
   wherein rolling the at least two rollers into the at least two pockets and installing a gooseneck or a fifth wheel hitch adapter joins the chassis to the truck bed under the gooseneck or the fifth wheel hitch adapter and the passenger compartment forward bulkhead compresses the gasket creating a seal between the passenger compartment and the truck cabin.

2. The automobile accessory of claim 1, further comprising:
   a heating, ventilation, and air conditioning system further comprising:
   an air plenum, arranged within the passenger compartment
   an intake fan, joined to the air plenum and configured to direct fresh air from a void, segmented into a left and right side into the air plenum;
   an air conditioner, arranged in the air plenum and joined to the air intake, an air exhaust, a conditioned air output, and a recycled air input;
   wherein passenger compartment air is conditioned and then released through a conditioned air output; then recycled air is pulled from the passenger compartment back into the air conditioner for further conditioning;
   wherein fresh air is directed into the passenger compartment through a vent valve joined to the air plenum when the intake fan is energized and the vent valve is open.

3. The automobile accessory of claim 2, further comprising an electrical service system further comprising:
   a power supply, joined to a vehicle DC electrical power supply with a 12V in-cabin switch, a powered-on relay and a quick disconnect plug;
   interior lights, entertainment, and electric drop leg jacks, electrically coupled to the vehicle DC electrical power supply within the passenger compartment;
   an inverter electrically coupled to the passenger compartment DC power supply;
   an air conditioner and an alternating current power strip, electrically coupled to the inverter and arranged within the passenger compartment.

4. The automobile accessory of claim 3, further comprising a first bench seat, arranged in the passenger compartment.

5. The automobile accessory of claim 4, further comprising a second bench seat, arranged in the passenger compartment behind the first bench seat.

6. The automobile accessory of claim 4, further comprising a bed, arranged in the passenger compartment behind the first bench seat.

* * * * *